US011001530B2

(12) United States Patent
Randall et al.

(10) Patent No.: US 11,001,530 B2
(45) Date of Patent: May 11, 2021

(54) COLD SINTERING COMPOSITES AND CERAMICS

(71) Applicant: The Penn State Research Foundation, University Park, PA (US)

(72) Inventors: Clive A. Randall, University Park, PA (US); Jing Guo, University Park, PA (US); Amanda Baker, University Park, PA (US); Michael Lanagan, University Park, PA (US); Hanzheng Guo, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/905,236

(22) Filed: Jun. 18, 2020

(65) Prior Publication Data

US 2020/0331810 A1    Oct. 22, 2020

Related U.S. Application Data

(60) Division of application No. 15/277,553, filed on Sep. 27, 2016, now Pat. No. 10,730,803, which is a
(Continued)

(51) Int. Cl.
*C04B 35/645* (2006.01)
*C04B 35/638* (2006.01)
(Continued)

(52) U.S. Cl.
CPC .............. *C04B 35/645* (2013.01); *B32B 5/16* (2013.01); *B32B 7/04* (2013.01); *B32B 9/005* (2013.01);
(Continued)

(58) Field of Classification Search
CPC ... C04B 35/645; C04B 35/447; C04B 35/453; C04B 35/495; C04B 35/638
See application file for complete search history.

(56) References Cited

U.S. PATENT DOCUMENTS 8,313,802 B2 * 11/2012 Riman ................ C04B 35/447
427/230
10,315,357 B2    6/2019 Riman
(Continued)

FOREIGN PATENT DOCUMENTS

JP        H038752 A       1/1991
JP        H08290949 A     11/1996
(Continued)

OTHER PUBLICATIONS

International Search Report and Written Opinion for PCT/US2016/053772 dated Dec. 8, 2016.
(Continued)

*Primary Examiner* — Alex B Efta
(74) *Attorney, Agent, or Firm* — Buchanan Ingersoll & Rooney PC

(57) ABSTRACT

Cold sintering of materials includes using a process of combining at least one inorganic compound, e.g., ceramic, in particle form with a solvent that can partially solubilize the inorganic compound to form a mixture; and applying pressure and a low temperature to the mixture to evaporate the solvent and densify the at least one inorganic compound to form sintered materials.

24 Claims, 9 Drawing Sheets

Related U.S. Application Data continuation of application No. PCT/US2016/053772, filed on Sep. 26, 2016.

(60) Provisional application No. 62/234,389, filed on Sep. 29, 2015, provisional application No. 62/349,444, filed on Jun. 13, 2016.

(51) Int. Cl.

| | | |
|---|---|---|
| *C04B 35/453* | (2006.01) | |
| *C04B 35/447* | (2006.01) | |
| *C04B 35/626* | (2006.01) | |
| *C04B 35/468* | (2006.01) | |
| *C04B 35/515* | (2006.01) | |
| *C04B 35/495* | (2006.01) | |
| *B32B 27/28* | (2006.01) | |
| *B32B 27/32* | (2006.01) | |
| *B32B 27/30* | (2006.01) | |
| *B32B 27/34* | (2006.01) | |
| *B32B 27/36* | (2006.01) | |
| *B32B 27/40* | (2006.01) | |
| *B32B 27/08* | (2006.01) | |
| *B32B 9/00* | (2006.01) | |
| *B32B 9/04* | (2006.01) | |
| *B32B 15/16* | (2006.01) | |
| *B32B 15/08* | (2006.01) | |
| *B32B 7/04* | (2019.01) | |
| *C04B 35/622* | (2006.01) | |
| *C04B 35/634* | (2006.01) | |
| *B32B 18/00* | (2006.01) | |
| *C04B 35/486* | (2006.01) | |
| *B32B 5/16* | (2006.01) | |
| *B32B 27/14* | (2006.01) | |

(52) U.S. Cl.
CPC ............. *B32B 9/045* (2013.01); *B32B 9/048* (2013.01); *B32B 15/08* (2013.01); *B32B 15/16* (2013.01); *B32B 18/00* (2013.01); *B32B 27/08* (2013.01); *B32B 27/14* (2013.01); *B32B 27/281* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/365* (2013.01); *B32B 27/40* (2013.01); *C04B 35/447* (2013.01); *C04B 35/453* (2013.01); *C04B 35/4682* (2013.01); *C04B 35/486* (2013.01); *C04B 35/495* (2013.01); *C04B 35/5152* (2013.01); *C04B 35/6263* (2013.01); *C04B 35/6264* (2013.01); *C04B 35/62222* (2013.01); *C04B 35/62685* (2013.01); *C04B 35/634* (2013.01); *C04B 35/638* (2013.01); *B32B 2250/02* (2013.01); *B32B 2262/101* (2013.01); *B32B 2262/106* (2013.01); *B32B 2264/107* (2013.01); *B32B 2307/20* (2013.01); *B32B 2307/202* (2013.01); *B32B 2307/204* (2013.01); *B32B 2307/50* (2013.01); *B32B 2307/546* (2013.01); *B32B 2307/702* (2013.01); *B32B 2307/704* (2013.01); *B32B 2307/728* (2013.01); *B32B 2307/732* (2013.01); *C04B 2235/3201* (2013.01); *C04B 2235/3203* (2013.01); *C04B 2235/3224* (2013.01); *C04B 2235/3236* (2013.01); *C04B 2235/3239* (2013.01); *C04B 2235/3256* (2013.01); *C04B 2235/3258* (2013.01); *C04B 2235/3272* (2013.01); *C04B 2235/3284* (2013.01); *C04B 2235/3291* (2013.01); *C04B 2235/3298* (2013.01); *C04B 2235/5436* (2013.01); *C04B 2235/604* (2013.01); *C04B 2235/6026* (2013.01); *C04B 2235/656* (2013.01); *C04B 2235/6562* (2013.01); *C04B 2235/6567* (2013.01); *C04B 2235/6588* (2013.01); *C04B 2235/77* (2013.01); *C04B 2235/785* (2013.01); *C04B 2237/068* (2013.01)

(56) References Cited

U.S. PATENT DOCUMENTS

| | | | |
|---|---|---|---|
| 2004/0159390 A1 | 8/2004 | Lautzenhiser et al. | |
| 2005/0143253 A1* | 6/2005 | Na | C04B 35/62625 501/103 |
| 2005/0244677 A1* | 11/2005 | Zaspalis | H01F 41/16 428/702 |
| 2007/0267948 A1* | 11/2007 | Feltz | H01L 41/43 310/364 |
| 2008/0171647 A1 | 7/2008 | Lee et al. | |
| 2009/0142578 A1 | 6/2009 | Riman et al. | |
| 2011/0104469 A1* | 5/2011 | Riman | C04B 35/2658 428/221 |
| 2012/0189833 A1* | 7/2012 | Suchanek | C04B 35/803 428/219 |

FOREIGN PATENT DOCUMENTS

| | | |
|---|---|---|
| JP | H107411 A | 4/1998 |
| JP | 2004115297 A | 4/2004 |
| JP | 2005306725 A | 11/2005 |
| KR | 1020110034747 A | 4/2011 |
| KR | 1020120136143 A | 12/2012 |
| WO | 2009102360 A2 | 8/2009 |
| WO | 2015069849 A1 | 5/2014 |

OTHER PUBLICATIONS

Extended European Search Report for European Patent Application No. 16852372.8 dated Feb. 13, 2019.
J. Guo et al. "Cold Sintering Process of Composites: Bridging the Processing Temperature Gap of Ceramic and Polymer Materials", Adv. Funct. Mater (2016) 26:7115-7121.
A. Baker et al., "Utilizing the Cold Sintering Process for Flexible-Printable Electroceramic Device Fabrication" J. Am. Ceram. Soc., vol. 99, No. 10 (2016) pp. 3202-3204.
J. Guo et al. "Cold Sintering: A Paradigm Shift for Processing and Integration of Ceramics", Angewandte Chem. Int. Ed. (2016) 55:11457-11461.
H. Guo, et al. "Hypothermal-Assisted Cold Sintering Process: A New Guidance for Low Temperature Ceramic Sintering", ACS Applied Materials & Interfaces (2016) 8:20909-20915, 34170.
L. He, et al. "Low-Temperature Sintering Li2MoO4/NiO.5AnO.US5Fe204 Magneto Dielectric Composites for High-Frequency Application" J. Am. Ceram. Soc., vol. 97, No. 8 (2014), pp. 2552-2556.
International Preliminary Report of Patentability for PCT/US2016/053772 dated Apr. 12, 2018.
Yamasaki, et al. "A Hydrothermal Hot-Pressing Method: Apparatus and Application", Journal of Material Science Letters, 5 Published 1986, pp. 355-356 (Year: 1986).
"Improvements and Modifications to Room-Temperature Fabrication Method for Dielectric Li2MoO4 Ceramics"; Hanna Kahari, Merja Teirikangas, Jari Juuti and Heli Jantunen, 2015 The American Ceramic Society, J. Am. Ceram. Sec. 98 [3] 687-689 (2015).
"A Review of Cold Sintering Processes"; Salvatore Grasso, Mattia Biesuz, Luca Zoli, Gianmarco Taveri, Andrew I. Duff, Daoyao Ke,

(56) References Cited

OTHER PUBLICATIONS

Anna Jiang and Michael J. Reece; Advances in Applied Ceramics; https://doi.org/10.1080/17436753.2019.1706825.

* cited by examiner

Increasing Temperature

Increasing Time

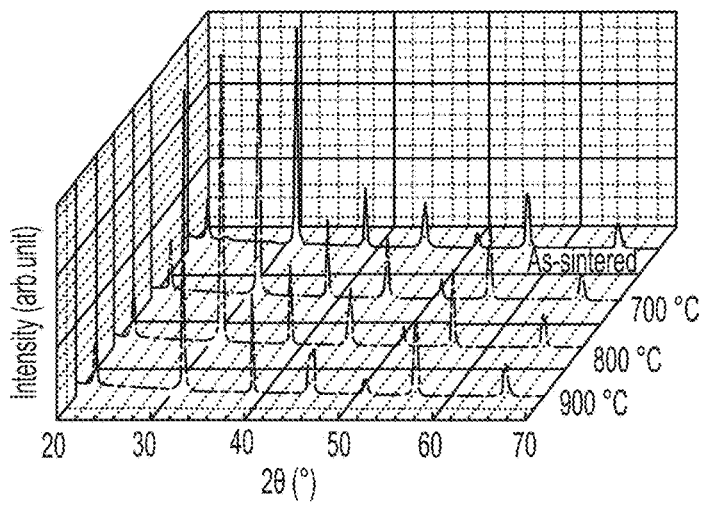
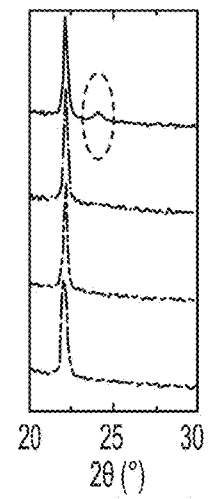
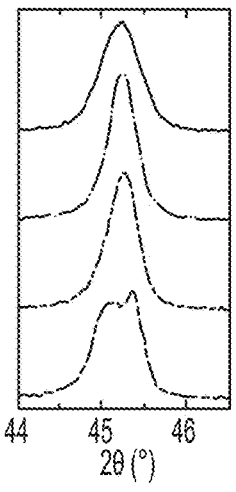
FIG. 5a  FIG. 5b  FIG. 5c
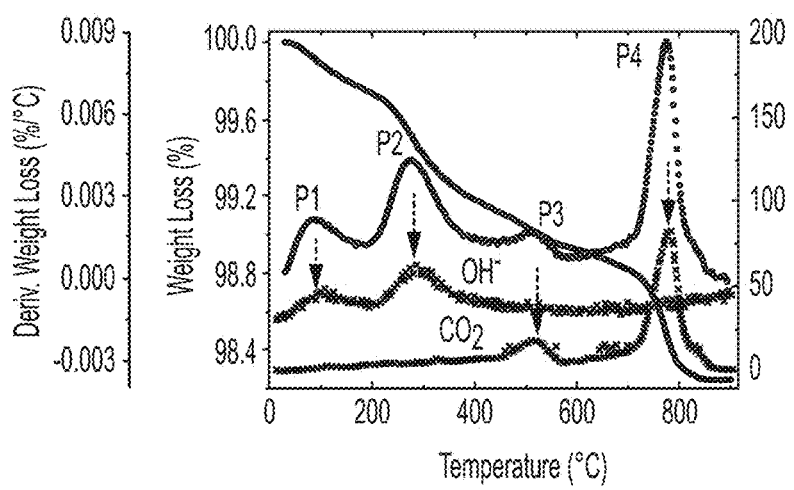
FIG. 5d
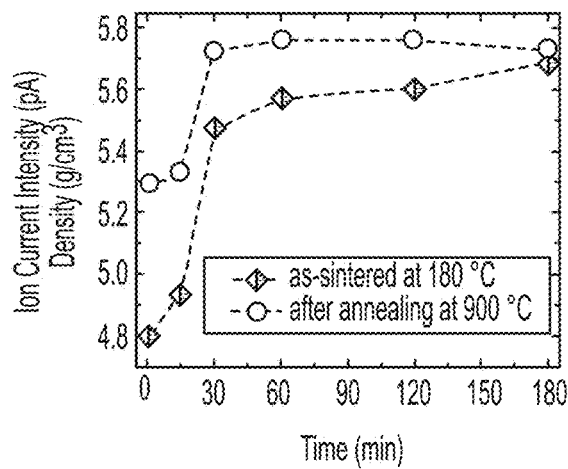
FIG. 5e

COLD SINTERING COMPOSITES AND CERAMICS

CROSS-REFERENCE TO RELATED APPLICATIONS

This application is a divisional application of U.S. patent application Ser. No. 15/277,553, which is a continuation of International Application No. PCT/US2016/053772, filed Sep. 26, 2016, which claims the benefit of U.S. Provisional Application No. 62/234,389 filed Sep. 29, 2015 and U.S. Provisional Application No. 62/349,444 filed Jun. 13, 2016 the entire disclosures of each of which are hereby incorporated by reference herein.

STATEMENT REGARDING FEDERALLY SPONSORED RESEARCH

This invention was made with government support under Grant No. IIP1361571, awarded by the National Science Foundation. The Government has certain rights in the invention.

TECHNICAL FIELD

The present disclosure relates to sintering inorganic compounds, e.g., ceramics, with or without other substances, at low temperatures.

BACKGROUND

Many ceramics and composites are sintered to reduce porosity and to enhance properties of the material such as strength, electrical conductivity, translucency, thermal conductivity, and heat capacity. However, many sintering processes involve the application of high temperatures, typically above 1,000° C., to densify and improve the properties of the material. The use of high temperatures precludes the fabrication of certain types of materials and adds to the expense of fabricating the material or devices. In addition, co-sintering of multi-material systems is difficult due to the differences in thermal stability, shrinkage temperature onsets and rates, and the physical and chemical incompatibilities of the components at high temperatures.

Certain low temperature processes for sintering ceramic are known and can address some of the issues related to high temperature sintering. For example, Ultra Low Temperature Cofired Ceramics (ULTCC) are fired between 450° C. and 750° C. See for example, He et al., "Low-Temperature Sintering $Li_2MoO_4/Ni_{0.5}Zn_{0.5}Fe_2O_4$ Magneto-Dielectric Composites for High-Frequency Application", J. Am. Ceram. Soc. 2014:97(8):1-5. Also Kahari et al. describe improving the dielectric properties of $Li_2MoO_4$ by moistening water-soluble $Li_2MoO_4$ powder, compressing it, and post processing the samples at 120° C. See Kahari et al., J. Am. Ceram. Soc. 2015:98(3):687-689. Kahari discloses the particle size of its powders were less than 180 microns but that smaller particle sizes complicates the even moistening of the powders resulting in clay-like clusters, non-uniform density, warpage and cracking and that a large particle size is advantageous. Still others prepare ceramics by combining reaction components to synthesize the ceramic at low temperatures. See, e.g., U.S. Pat. No. 8,313,802. Such preparations take long periods of time lasing several hours to days to produce dense ceramics.

However, a continuing need exists for low temperature processes for sintering ceramics and composites.

SUMMARY OF THE DISCLOSURE

An advantage of the present disclosure is a process to densify materials using a solvent and at a temperature around the boiling point of the solvent which is well below typical temperatures to sinter a material by many hundreds of degrees centigrade. Advantageously, the processes of the present disclosure can use an aqueous based solvent and temperatures no more than 200° C. above the boiling point of the solvent.

These and other advantages are satisfied, at least in part, by a process for preparing a sintered material by combining at least one inorganic compound in particle form with a solvent that can partially solubilize the inorganic compound to form a mixture; and applying pressure and heat to the mixture to evaporate the solvent and densify the at least one inorganic compound to form the sintered material. Advantageously, the applied heat is at a temperature of no more than 200° C. above the boiling point of the solvent. The cold sintering process of the present disclosure can advantageously provide dense materials in short periods of time.

Another aspect of the present disclosure includes a process for preparing a sintered composite, the process comprising combining at least one inorganic compound in particle form and at least one other substance with a solvent that can partially solubilize the inorganic compound to form a mixture; and applying pressure and heat to the mixture to evaporate the solvent and densify the at least one inorganic compound to form the composite. Advantageously, the applied heat is at a temperature of no more than 200° C. above the boiling point of the solvent. The other substance can be a different inorganic compound or it can be a polymer, metal or other material such as a glass or carbon fibers, for example. Advantageously, the low temperature sintering of the present disclosure allows cold sintering of other substances that degrade or oxide at a temperature above 200° C.

Another aspect of the present disclosure includes a process for preparing a sintered inorganic compound on a substrate. The process includes depositing an inorganic compound (e.g., a ceramic) on a substrate (e.g., a substrate comprised of a metal, ceramic, polymer or combinations thereof). In some embodiments, the inorganic compounds can be deposited on multiple substrates to form laminates. Solvent can be combined with the inorganic compound before, during or after deposition thereof. In other embodiments, the process includes depositing an inorganic compound (e.g., a ceramic) on a substrate followed combining the inorganic compound with a solvent such as by exposing a deposited ceramic to an aqueous solvent to form a wetted deposited ceramic. Heat and pressure can be applied to the wetted deposited ceramic to sinter the ceramic on the substrate. Advantageously, the applied heat can be no more than 200° C., the applied pressure no more than 5,000 MPa and the ceramic can be sintered to a relative density of no less than 85% in a short period of time.

Embodiments of the present disclosure include one or more of the following features individually or combined. For example, the cold sintering of the present disclosure is applicable to both inorganic compounds that have congruent dissolution and incongruent dissolution in the solvent. For inorganic compounds, the solvent can include one or more source compounds. In some embodiments, the at least one inorganic compound or ceramic can have a particle size of less than 100 µm, or less than 50 µm, 30 µm, 20 µm, 10 µm, and even less than about 5 µm or less than about 1 µm and into the nanometer regime. In other embodiments, the solvent can include water with soluble salts and one or more of a $C_{1-12}$ alcohol, ketone, ester, and/or an organic acid with one or more soluble salts or source compounds wherein the solvent has a boiling point below about 200° C. In still other embodiments, the heat applied to the mixture is at a temperature below about 250° C., e.g., below about 200° C. or below about 150° C., such as below about 100° C. In still further embodiments, the inorganic compound and solvent can be combined by exposing the inorganic compound to a controlled relative atmosphere of the solvent, e.g., a humid atmosphere when the solvent is water based, or by mixing the solvent with the inorganic compound such as mixing a solvent that includes at least 50% by weight of water.

The cold sintering process of the present disclosure can advantageously provide dense sintered materials, e.g., dense inorganic compounds, ceramics, composites. The process of the present disclosure can densify the material to a relative density of greater than 60%, e.g., greater than 80% such as no less than 85% and even greater than 90%. In addition, the cold sintering process of the present disclosure can densify the sintered material in short time periods. For example, the cold sintering process of the present disclosure densifies the sintered material to a relative density of at least 85% and even at least 90% in less than 180 minutes, e.g., less than 120 minutes, such as no more than 60 minutes. In some embodiments, the cold sintering process of the present disclosure densifies the sintered material to a relative density of at least 85% and even at least 90% in no more than 30 minutes, for example.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIGS. 4a to 4c are charts showing the relative densities of $K_2Mo_2O_7$ ceramics sintered under various conditions. FIG. 4a is a chart of the relative densities of $K_2Mo_2O_7$ ceramics sintered at 120° C. for 5 min with different pressures; FIG. 4b is a chart showing the relative densities of $K_2Mo_2O_7$ ceramics sintered at a pressure of 350 MPa for 5 min with different temperatures; and FIG. 4c is a chart showing the relative densities of $K_2Mo_2O_7$ ceramics sintered at 120° C. at a pressure of 350 MPa with different holding times.

FIGS. 5a-5c are XRD patterns of cold-sintered bulk $BaTiO_3$ ceramic, and after annealing at 700-900° C. Impurity phase ~24° is outlined by the dash circle in (b).

FIG. 5d is a TGA-MS plot for cold-sintered $BaTiO_3$ ceramic from 30-900° C. Four peaks are marked as P1-P4 on the derivative weight loss curve.

FIG. 5e is a plot of density evolution of cold-sintered and subsequently annealed $BaTiO_3$ ceramics as a function of cold sintering time at 180° C.

FIG. 7a is a plot of microwave permittivity; FIG. 7b is a plot of Q×f values; FIG. 7c is a plot of temperature coefficient of resonant frequency; FIG. 7d is a plot of elastic modulus; and FIG. 7e is a plot of shear modulus.

FIG. 8a is a plot of conductivities at 25° C. obtained from impedance measurements and FIG. 8b is a plot of activation energies of LAGP-(PVDF-HFP) composites as a function of PVDF-HFP volume fraction before and after soaking in 1 M $LiPF_6$ EC-DMC (50:50 vol. %). FIG. 8c is a plot of DC conductivities at 25° C. and FIG. 8d is a plot of activation energies of $V_2O_5$-PEDOT:PSS composites as a function of PEDOT:PSS volume fraction.

FIG. 9a is a low magnification image of the dielectric cold sintered on PET film and FIG. 9b is a high magnification image with top and bottom silver electrodes.

DETAILED DESCRIPTION OF THE DISCLOSURE

Figure 1:
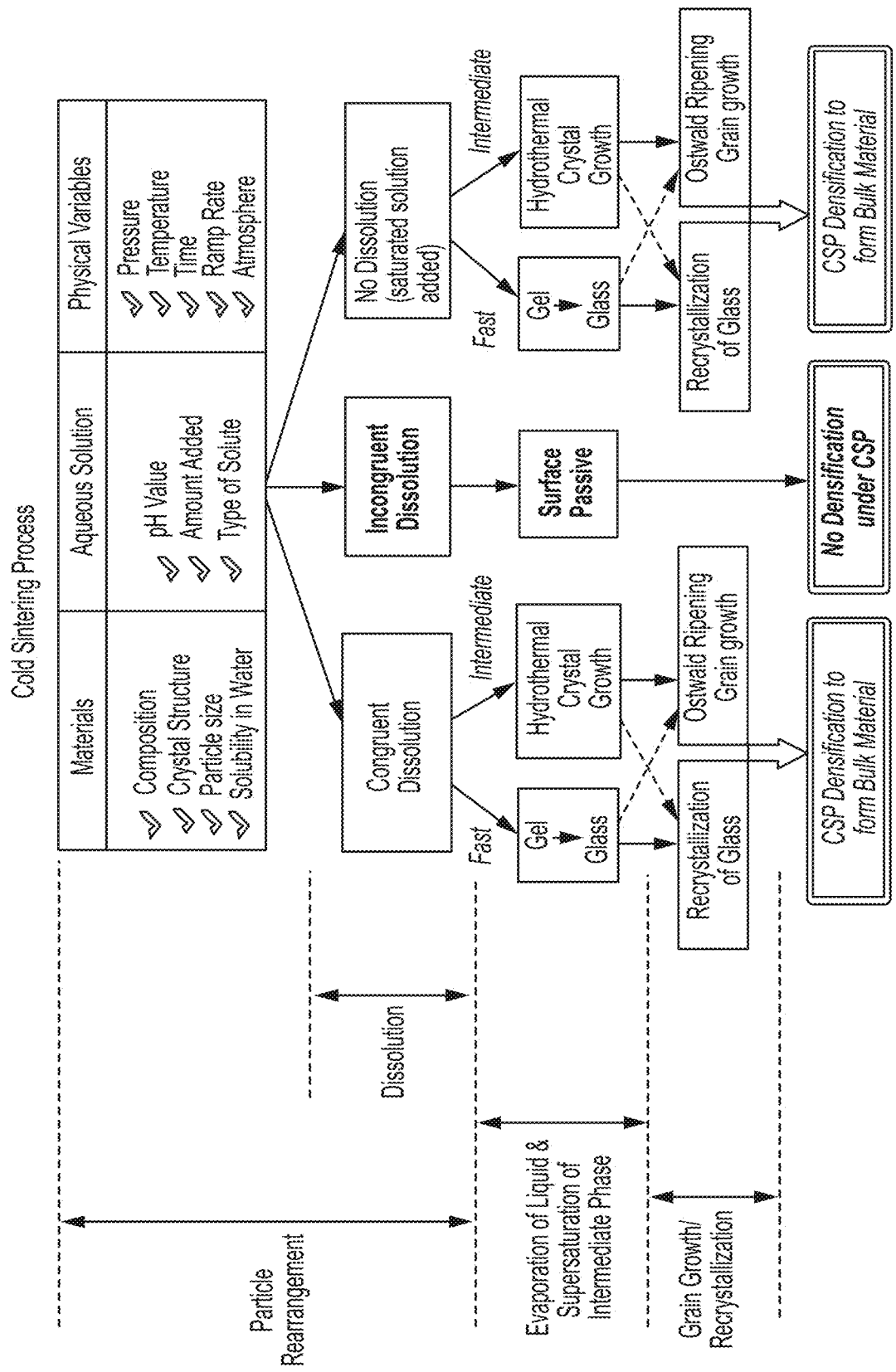
FIG. 1 illustrates a basic mechanism that can be used for a cold sintering process according to embodiments of the present disclosure. The process is a basic, unique liquid phase sintering process that has not been exploited in the manufacture of sintered ceramic materials.
Figures 2A, 2B, 2C:
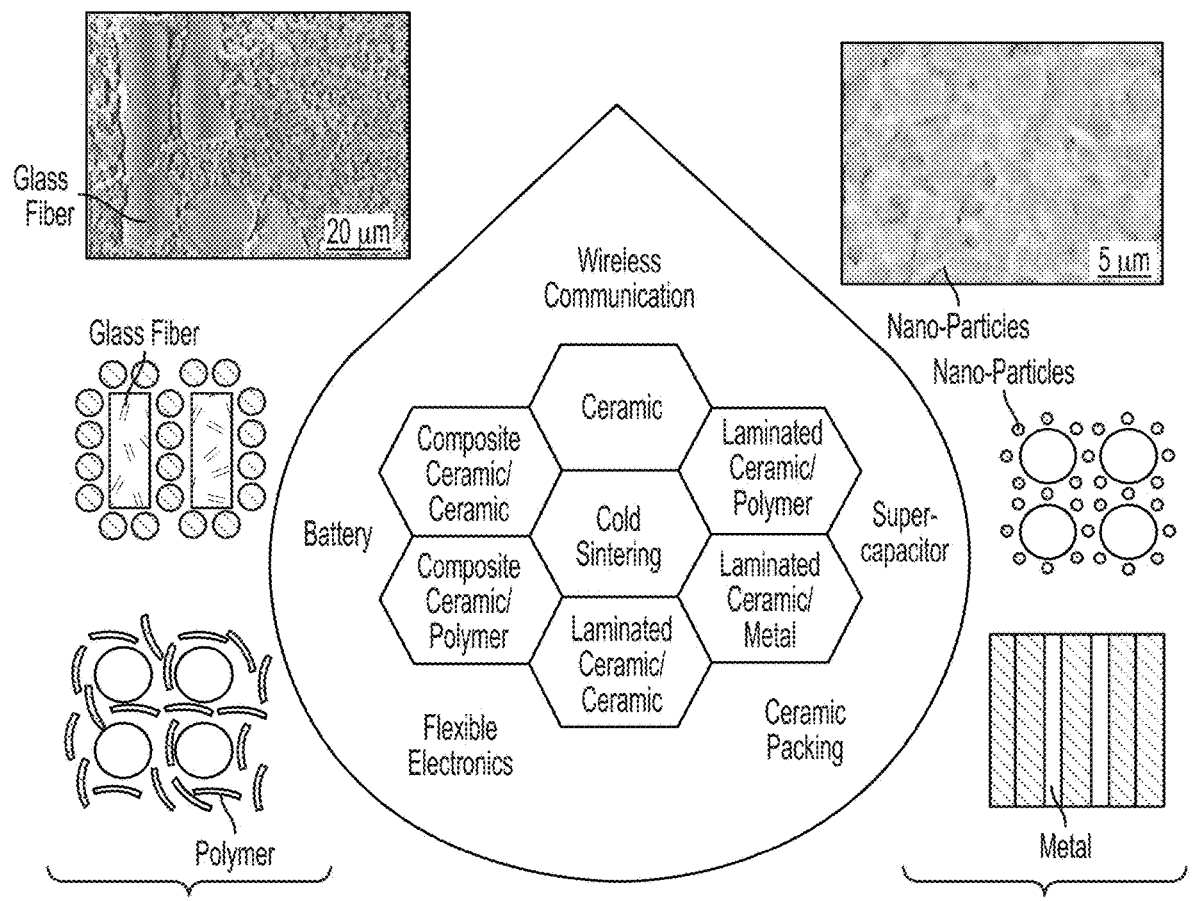
FIGS. 2a-2f show the basic diversity and integration for which cold sintering can be employed.
Figure 2D:
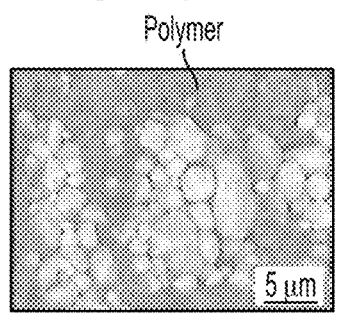
Figure 2E:
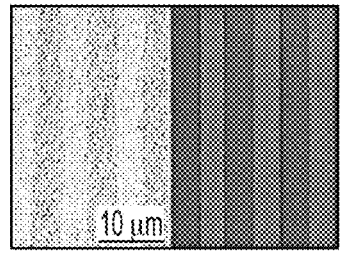
Figure 2F:
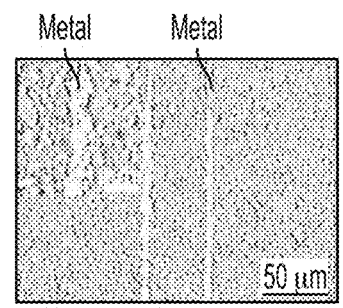

Sintering refers to a process that transforms a solid to a dense solid and typically includes thermal energy and/or pressure. The present disclosure relates to cold sintering processes. That is, the present disclosure relates to processes to densify materials using a solvent that at least partially dissolves a component of the material and at a temperature within about the boiling point of the solvent and temperatures up to 200° C. above the boiling point (i.e., cold sintering). Preferably the applied heat is at a temperature at the boiling point of the solvent and temperatures 50 to 80° C. above the boiling point. As used herein the boiling point of the solvent is the boiling point at 1 atmosphere. In some embodiments, the sintering temperature is no more than 200° C. The process of the present disclosure can achieve dense solids at low temperatures across a wide variety of chemistries and composites.

The process includes combining at least one inorganic compound in particle form with a solvent that can partially solubilize the inorganic compound to form a mixture. Other components, e.g., other substances, can also be included with the inorganic compound. The process sinters (e.g., densifies) the inorganic compound, with or without other components, by application of pressure and heat at a temperature to evaporate the solvent. The application of pressure and heat at a temperature to evaporate the solvent advantageously causes the solvent to evaporate and densifies the inorganic compound, with or without other components, to form a densified material or composite. The other substance is a substance that is different from the at least one inorganic compound. The other substance can be a different inorganic compound or it can be a polymer, metal, or other material, for example.

Inorganic compounds useful for the present disclosure include, for example, ceramics, such as metal oxides, such as lithium metal oxides and non-lithium metal oxides, metal carbonates, metal sulfates, metal selenides, metal fluorides, metal tellurides, metal arsenide, metal bromides, metal iodides, metal nitrides, metal sulphides, metals and metal carbides.

We discovered that using fine powders for the at least one inorganic compound prior to forming the mixture advantageously gave better properties for the densified material. Fine powders can be produced by milling the inorganic compound such as by ball milling, attrition milling, vibratory milling and jet milling, for example.

In one aspect of the present disclosure, the at least one inorganic compound in particle form has a particle size of less than 100 μm, or less than 50 μm, 30 μm, 20 μm, 10 μm, and even less than about 5 μm or less than about 1 μm. Particle size can be determined by sedigraph methods, laser diffraction or equivalent methods in which at least 95% of the particles are at or below the stated particle size.

Advantageously, the temperature applied is no more than about 200° C. above the boiling point of the solvent. It is believed that the application of heat causes the solvent to evaporate, supersaturate the solubilized species and densifies the at least one inorganic compound to form the sintered material and/or composite. In an aspect of the present disclosure, the heat applied to the mixture is at a temperature below about 250° C., e.g., below about 200° C. or below about 150° C., such as below about 100° C.

While the pressures applied during the processes of the present disclosure are not limited, the materials of the present disclosure can be sintered under pressure of no more than about 5,000 MPa and preferably under an intermediate pressure, e.g., about 30 MPa to about 2,000 MPa, e.g., from about 250 MPa to about 750 MPa. The pressure can be applied to aid cold sintering while the solvent can evaporate from the system.

Solvents useful in practicing the disclosure include one or more of a $C_{1-12}$ alcohol, ketone, ester, water and/or mixtures thereof. Water can also be a solvent either alone or with one or more of a $C_{1-12}$ alcohol, ketone, or ester or mixtures thereof with or without a soluble salt. Other components can be added to the solvent to adjust its pH, such as acidic components, including organic acids, e.g., citric acid, acetic acid, formic acid, nitric acid, oleic acid, etc. In an aspect of the present disclosure, the solvent can be an aqueous medium including water with optionally one or more soluble salts and optionally one or more $C_{1-12}$ alcohols, ketones, esters, and/or organic acids. Embodiments include an aqueous solvent which includes at least 50% by weight of water and one or more other components such an organic acid or one or more of a $C_{1-12}$ alcohol, ketone, ester, or soluble salt or mixtures thereof. Preferably, the solvent has a boiling point below about 200° C., e.g., below about 120° C.

In one aspect of practicing the present disclosure, water and slightly acidic water can be added to the material in powder form before consolidation or afterwards in the form of water vapor. Other solvents can be used to control the kinetics of the process, but water works sufficiently well in terms of practice.

The solvent can be combined with the inorganic compound and optional other components of the mixed with the inorganic compound by directly adding it to a prepared mixture of a fine powder of the inorganic compound and optionally other components or by exposing the inorganic compound and optional other components with vapor from the solvent. The inorganic compound and optional other components can be under partial pressure during the addition of the solvent. In practicing an embodiment of the present disclosure, the solvent can simply be mixed in a small amount, e.g., less than about 30% by weight of the total solids such as less than about 0.3 g/1 g wt/wt, or by exposing the inorganic compound in powder form to a controlled relative atmosphere of the solvent such as exposing the inorganic compound to humid atmosphere for an aqueous solvent.

Advantageously, the cold sintering process densifies the material. The relative density of the sintered material, e.g., inorganic compound, ceramic or composite, is greater than 60%, e.g., greater than 80% such as no less than 85% and even greater than 90%. The relative density of the sintered material is determined by Mass/Geometry ratio or Archimedes' method or an equivalent method. In addition, the cold sintering process of the present disclosure densifies the sintered material in short time periods. For example, the cold sintering process of the present disclosure densifies the sintered material to a relative density of at least 85% and even at least 90% in less than 180 minutes, e.g., less than 120 minutes, such as no more than 60 minutes. In some embodiments, the cold sintering process of the present disclosure densifies the sintered material to a relative density of at least 85% and even at least 90% in no more than 30 minutes, for example.

The cold sintering process of the present disclosure is believed to be a low temperature liquid phase sintering process using a solvent, e.g., an aqueous medium, as a transient solvent. For example and in an embodiment of the present disclosure, a ceramic powder is uniformly moisturized with a small amount of solvent, e.g., an aqueous solution. It is believed that the solid surfaces of the ceramic powder decompose and partially dissolve in the solvent, so that a controlled amount of liquid phase is intentionally introduced at the particle-particle interfaces. This can be accomplished by simply mixing in a small amount, such as a few drops of the solvent, or exposing the powder to a controlled relative atmosphere of the solvent such as humid atmosphere for an aqueous solvent. It is believed that the dissolution of sharp edges of solid particles of the powder reduces the interfacial areas, and some capillarity forces aid the rearrangement in the first stage. With the assistance of sufficient external and capillarity pressure, the liquid phase redistributes itself and fills into the pores between the particles. Applying a uniaxial pressure, the solid particles rearrange rapidly, which collectively leads to an initial densification. A subsequent growth stage, often referred to as "solution-precipitation", is created through the evaporation of the solvent that enables supersaturated state of the liquid phase at a low temperature right above the boiling point of the solvent, e.g., right above 100° C. for an aqueous solvent, triggering a large chemical driving force for the solid and liquid phases to reach high levels of densification.

In practicing an embodiment of the present disclosure, ceramics can be sintered at low temperature. In such an embodiment, the process includes a ceramic in particle form that is exposed to a solvent, e.g., an aqueous solvent, in an amount of from 1 to 25 wt % whereupon there is a partial dissolution of the ceramic to form a mixture, e.g., a particle bed. This particle bed with solvent can be exposed to a uniaxial pressure and under a controlled drying rate can provide particle rearrangement and precipitation to densify the particles and sinter to a dense ceramic, e.g., to a relative density of no less than 85%, such as greater than 90% in a short time period, e.g., less than 120 minutes such as 60 minutes or less.

Table 1 below shows materials that have already been demonstrated to undergo cold sintering according to the present disclosure.

TABLE 1

| Binary Compounds | Binary Compounds | Ternary Compounds | Ternary Compounds | Quaternary Compounds | Quinary Compounds |
|---|---|---|---|---|---|
| $MoO_3$ | NaCl | $Li_2CO_3$ | $BiVO_4$ | $LiFePO_4$ | $Li_{1.5}Al_{0.5}Ge_{1.5}(PO_4)_3$ |
| $WO_3$ | ZnTe | $CsSO_4$ | $AgVO_3$ | $LiCoPO_4$ | $Li_{0.5x}Bi_{1-0.5x}Mo_xV_{1-x}O_4$ |
| $V_2O_3$ | AgI | $Li_2MoO_4$ | $Na_2ZrO_3$ | $KH_2PO_4$ | |
| $V_2O_5$ | CuCl | $Na_2Mo_2O_7$ | $BaTiO_3$ | $Ca_5(PO_4)_3(OH)$ | |
| ZnO | $ZrF_4$ | $K_2MO_2O_7$ | $NaNO_2$ | $(LiBi)_{0.5}MoO_4$ | |
| $Bi_2O_3$ | $\alpha$-$Al_2O_3$ | $ZnMoO_4$ | $Mg_2P_2O_7$ | | |
| CsBr | $ZrO_2$ $_{PSZ}$ | $Li_2WO_4$ | $BaMoO_4$ | | |
| MgO | $ZrO_2$ $_{Cubic}$ | $Na_2WO_4$ | $CS_2WO_4$ | | |
| PbTe | | $K_2WO_4$ | $Na_xCo_2O_4$ | | |
| $Bi_2Te_3$ | | $Bi_2VO_4$ | $Ca_3Co_4O_9$ | | |
| | | $LiVO_3$ | $KPO_3$ | | |
| | | $SrTiO_3$ | $LiCoO_2$ | | |

The materials provided in Table 1 were cold sintered in accordance with the present disclosure to a density of no less than 80% and most of the materials were cold sintered in accordance with the present disclosure to a density of no less than 85%. PZT materials, such as $PbZrTiO_3$ can also be cold sintered.

In bulk form, we have demonstrated wide applications of different chemistries and crystal structures across binary, ternary, quaternary, quinary oxides, carbonates, fluorides, sulphates, phosphates and bromides that can be cold sintered. The materials selected have practical interest in the form of dielectric materials, electrochemical materials, ionic electrolytes, mixed ionic conductors, ferroelectrics, semiconducting materials, thermoelectric materials, biomaterials and catalytic substrate applications. The cold sintering processes disclosed herein can be applicable to arsenides, borides, bromides, carbonates, carbides, fluorides, metals, nitrides, oxides, phosphates, selenides, sulfides, tellurides, etc. with sufficient solubility in the solvent, and kinetics of re-precipitation from the transient supersaturated grain boundary phase is sufficiently fast relative to the heating rates. Sintering of hydroxyapatite (HA) can also be undertaken by the present cold sintering processes disclosure herein.

In addition to the single phase monolithic substrates that can be produced under cold sintering, many composites and integrated devices can be formed through the cold sintering process. These can be in the form of mixed materials, laminated materials, and interconnected materials through thick film methods as used in electronic packages. The low temperatures and fast sintering times under cold sintering permits us to also integrate with the sintered material polymers, nanometals, nanoceramics, biomaterials, biological cells, proteins, drugs, and glass or carbon fibers for mechanical strength, all giving greater design flexibility and functionality that has previously not been available to bulk ceramics and composites. Electroceramics and refractories can also be fabricated.

In addition, laminated ceramics can be formed through the tape casting process and using low temperature binder systems, such as QPac™, (polyalkylene carbonate) and its appropriate solvents and plasticizers. This can be used to cast the ceramic materials, and then these can be laminated. First, we can remove the binder at temperature 170° C. to 200° C. in air or nitrogen atmospheres. These materials can then carefully be exposed to high humidity to take up water in the surface of the particles. After a sufficient time, these unsintered laminates can be put in a uniaxial press and heated at 100° C. to less than 200° C. as a cold co-sintering process. In other cases, we can just mix volume fractions of polymer powders 0-60% and the ceramics (100% to 40%), press them to form the initial shape, then expose the pressed shape to humidity and then undergo cold sintering to form dense co-sintered ceramics, and ceramic polymer composites. Cold sintering can be done in any gaseous atmosphere, but inert atmospheres are preferred, e.g., nitrogen or argon, and atmospheres that do not contain measurable $CO_2$.

FIG. 1 shows basic mechanisms for the cold sintering process according to certain embodiments. The process is a basic, unique liquid phase sintering process that has not been exploited in the manufacture of ceramic materials.

FIGS. 2a-2f show the basic diversity and integration contemplated for cold sintering of the present disclosure. Typical examples include microwave devices, electronic packages, and thermoelectric energy-conversion systems, as well as electrochemical systems, such as Li-ion batteries, where polymer separators and binders are interfaced with ceramic anode and cathode materials. The impact would also be in systems that involve development of nanocomposites, and even simple monolithic applications, such as substrates, ceramic filters, and catalytic supports that could be processed at significantly lower temperatures with fast production times, enabling manufacturing to have higher throughput, cost- and energy-savings.

The following data are provided to further demonstrate the practice of the processes of the present disclosure and characteristics of the sintered materials and composites therefrom.

Figure 3A:
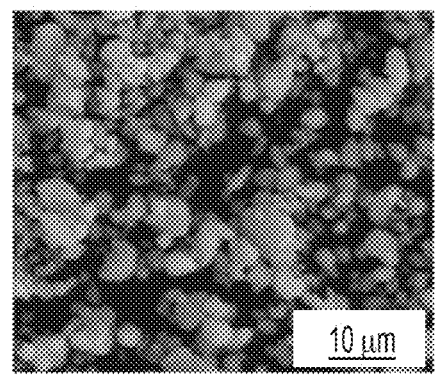
FIGS. 3a-3e are SEM micrographs of $K_2Mo_2O_7$ in various forms. The figures show one example of microstructural development through varying processing conditions of time, temperature and pressure.
Figure 3B:
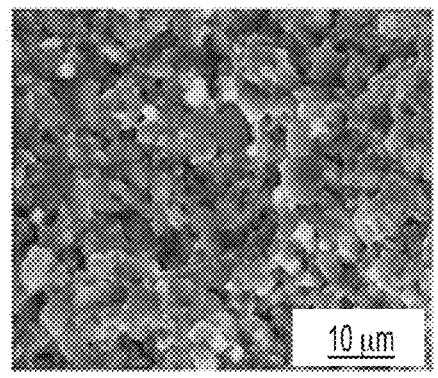
Figure 3C:
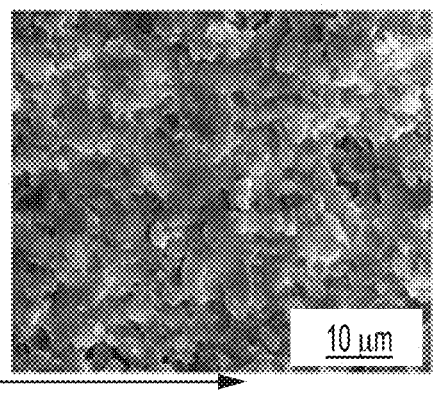
Figure 3D:
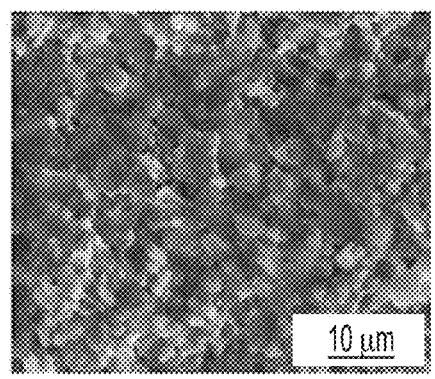
Figure 3E:
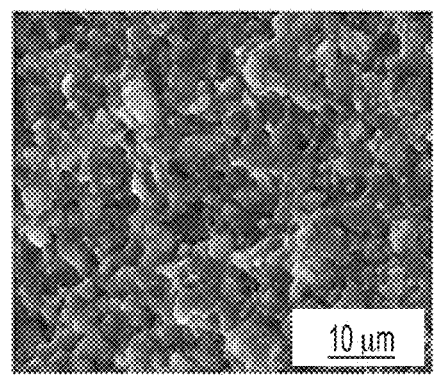

For example, FIGS. 3a-3e illustrate microstructural development through varying processing conditions of time, temperature and pressure. FIGS. 3a-3e are SEM micrographs of $K_2Mo_2O_7$ in various forms. FIG. 3(a) shows the $K_2Mo_2O_7$ powder; FIG. 3(b) shows the $K_2Mo_2O_7$ ceramic sintered at 120° C. for 5 min at a pressure of 350 MPa; FIG. 3(c) shows the $K_2Mo_2O_7$ ceramic sintered at 180° C. for 5 min at a pressure of 350 MPa; FIG. 3(d) shows the $K_2Mo_2O_7$ ceramic sintered at 120° C. for 15 min at a pressure of 350 MPa; and FIG. 3(e) shows the $K_2Mo_2O_7$ ceramic sintered at 120° C. for 30 min at a pressure of 350 MPa.

Figure 4A:
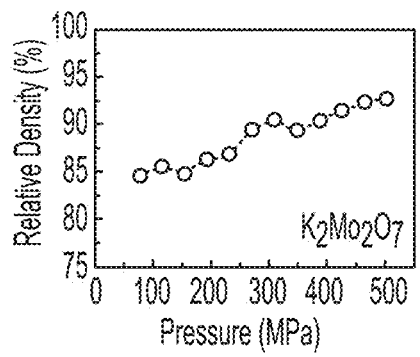
FIGS. 4a to 4c show densification trends for time, temperature and pressure variables. For example.
Figure 4B:
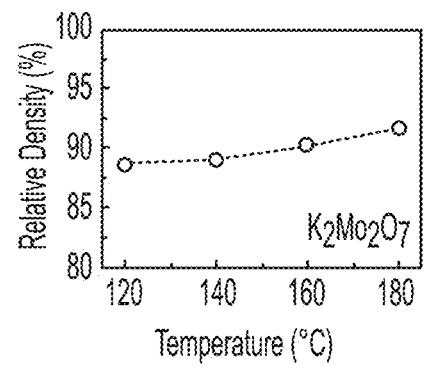
Figure 4C:
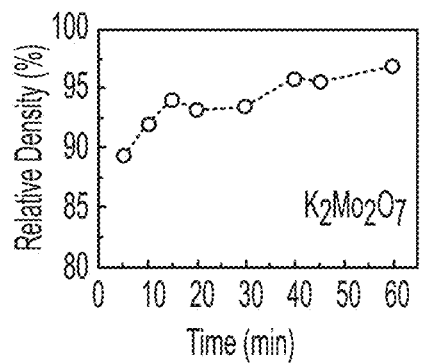

FIGS. 4a to 4c show densification trends for time, temperature and pressure variables. For example, FIGS. 4a to 4c are charts showing the relative densities of $K_2Mo_2O_7$ ceramics sintered under various conditions. FIG. 4a is a chart of the relative densities of $K_2Mo_2O_7$ ceramics sintered at 120° C. for 5 min with different pressures; FIG. 4b is a chart showing the relative densities of $K_2Mo_2O_7$ ceramics sintered at a pressure of 350 MPa for 5 min with different temperatures; and FIG. 4c is a chart showing the relative densities of $K_2Mo_2O_7$ ceramics sintered at 120° C. at a pressure of 350 MPa with different holding times. The data in these figure show how time, temperature and pressure can affect cold sintering of a give system.

Cold sintering of $Li_2MoO_4$, $Na_2Mo_2O_7$, $K_2Mo_2O_7$, and $V_2O_5$ illustrate the sintering of sparingly soluble single and mixed metal oxide ceramics. As shown in FIG. 4a-c, $K_2Mo_2O_7$ samples are sintered to 89% relative density at 120° C. within 5 min under a pressure of 350 MPa (FIG. 4c). Extending the holding time to 10-20 min, we obtained ceramics with relative densities >90%, which is comparable to those densities found with a conventional thermal sintering temperature of 460° C. By appropriately varying temperature, pressure, holding time and water content, we cold sintered $Li_2MoO_4$, $Na_2Mo_2O_7$, $K_2Mo_2O_7$, and $V_2O_5$ ceramics to high density (>90%) phase pure ceramics at a temperature as low as 120° C. SEM images indicate that the grain growth is substantially limited under these experimental conditions. To this point, the grain sizes of the sintered ceramics could be easily tailored through control of the initial powder particle size. Such a technique may be utilized to produce polycrystalline materials with controllable and uniform grain sizes, or even preserve the nanoscale size of the crystallites in the final products as shown for $LiFePO_4$. This set of experiments demonstrates the effective use of pressure to enhance the driving force for cold sintering. The pressure assists both particle rearrangement and the dissolution precipitation process at particle contacts.

Since cold sintering involves precipitation of a complex metal oxide-based phase, the appearance of a small fraction of an amorphous phase in the ceramic grain boundaries seems reasonable. The formation of an amorphous grain boundary phase depends on the rate of solute condensation as controlled by the rate of solvent evaporation, and the associated degree of solute super-saturation before condensation of the dissolved phase. We further studied the amorphous-ceramic interface in cold-sintered $Na_2Mo_2O_7$ from the atomic-scale view, with representative crystallites oriented along their [110] directions.

We observed that the amorphous-crystalline interface is typically arranged in a terrace-ledge manner, which is consistent with the classic Terrace-Ledge-Kink (TLK) model used to describe the equilibrium state of a crystal surface growing from the vapor or liquid; the terrace ends in a ledge and steps down to another one, and the missing atoms in the ledge forms kink sites. From a thermodynamic perspective, the step ledges and kinks provide energetically favorable sites for atomic diffusion and surface free energy minimization during liquid phase sintering, as the ionic species attached to these sites can establish a sufficient number of chemical bonds with the crystal surface so as to resist re-dissolving. In the amorphous phase, nanometer-sized precipitates are also observed to nucleate on the crystal surface. Additionally, we performed an extensive scanning/transmission electron microscopy (S/TEM) study to examine the grain-grain interface region in cold-sintered $Na_2Mo_2O_7$ ceramics. We estimate that 90% of grain boundaries have no amorphous phase, indicating that highly crystalline ceramics are approachable.

An advantage of cold sintering processes of the present disclosure includes the electrical properties of cold sintered $Li_2MoO_4$, $Na_2Mo_2O_7$, $K_2Mo_2O_7$, and $V_2O_5$ ceramics, which are comparable to those prepared by conventional thermal sintering at 540° C., 575° C., 460° C., and 450-660° C., respectively (Table 3, in the Examples section below). The data demonstrates that many simple and mixed metal oxides, metal chlorides and composites in a number of crystal structures with a variety of different melting temperatures can be sintered between room temperature and 200° C.; certain of the cold sintered inorganic compounds are listed in Table 1.

The processes of cold sintering of the present disclosure are applicable to both inorganic compounds that have congruent dissolution and incongruent dissolution in the solvent. Congruent dissolution involves substantially no change in the composition of the compound upon its dissolution whereas incongruent dissolution involves a substantial change in composition of the compound upon its dissolution in the solvent.

Incongruent dissolution is prevalent in a large number of materials, and which also have limited solubility in aqueous media, especially for the close-packed structures in which the atoms/molecules/ligands are tightened by strong chemical bonding. A well-known example is $BaTiO_3$, which is not thermodynamically stable in aqueous environment of pH<12. As $BaTiO_3$ particles react with water, Ba is preferentially leached out from the surface area, resulting in a Ba deficient layer with a Ti-rich amorphous shell. This amorphous layer is detrimental for the precipitation process since it separates the solution and crystal lattices and significantly impedes crystal growth from the supersaturated solution by limiting the mass transport between them. Therefore, simply mixing water with a $BaTiO_3$ powder and applying heat does not densify the ceramic.

In an aspect of the present disclosure, inorganic compounds that would ordinarily incongruently dissolve in a solvent can be cold sintered, with or without other substances. The process includes combining at least one inorganic compound in particle form with a solvent that can partially solubilize the inorganic compound to form a mixture. For this aspect, the solvent is saturated or supersaturated with one or more source compounds prior to contacting the solvent with the inorganic compound. The source compounds are preferable compounds that can synthesize the inorganic compound. Alternatively, the source compounds are compounds that substantially prevent incongruent dissolution of the inorganic compound when in contact with the solvent. Saturating to supersaturating the solvent with one or more source compounds prior to contact with the inorganic compound minimizes or prevents leaching of elements form the inorganic compound. It is believed leaching is due to the concentration difference between the solvent and the solid surface of the inorganic particles and adding the source compounds to the solvent to reach the concentration in saturate or supersaturation states prevents or minimizes leaching. While this aspect of the process of the present disclosure is particularly useful for inorganic compounds that incongruently dissolve in the solvent, it can be used for congruent dissolving compounds as well. The use of solvents including source compounds in the cold sintering process of the present disclosure is different from a process of combining reactive compounds to synthesize an inorganic compound in that the cold sintering process of the present disclosure starts with a fully synthesized inorganic compound and densifies the compound rather than to synthesize the compound from reaction components.

The process continues by applying pressure and heat to the mixture to evaporate the solvent and densify the at least one inorganic compound to form a sintered material or composite. The applied heat in the embodiment is the same as in earlier embodiments, e.g., the applied heat is at a temperature of no more than 200° C. above the boiling point of the solvent or at a temperature below about 250° C., e.g., below about 200° C. or below about 150° C., such as below about 100° C. The at least one inorganic compound can include particles sized less than 100 μm, or less than 50 μm, 30 μm, 20 μm, 10 μm, and even less than about 5 μm or less than about 1 μm. A high relative density can be achieved in a short time period, e.g., a relative density of at least 85% and even greater than 90% can be achieved in less than 180 minutes, e.g., less than 120 minutes, such as no more than 60 minutes or no more than 30 minutes.

By practicing a process of cold sintering that includes using a solvent with source compounds, many ceramics that tend to dissolve incongruently in aqueous media can be sintered at low temperatures. $BaTiO_3$ is a good material to demonstrate the advantages of cold sintering process of the present invention because: (1) it is a widely used ceramic material, particularly for multilayer ceramic capacitor (MLCC), (2) a dense $BaTiO_3$ ceramic is generally accomplished at 1200-1400° C. by conventional thermal sintering, and (3) compared to the micrometer-sized powder, $BaTiO_3$ nanoparticles are generally more chemically reactive due to their high surface energy. For preparing a cold sintered $BaTiO_3$, the following were employed: (1) high quality $BaTiO_3$ nanoparticles were employed as the starting powders; our transmission electron microscopy (TEM) study suggests that these nanocrystallites are well crystallized without noticeable amorphous phase on their surfaces, and the chemical species are uniformly distributed as well; (2) the liquid phase is always maintained in a supersaturate state with enough amount of Ba source so that the dissolution of Ba from $BaTiO_3$ surface is largely inhibited; (3) as with hydrothermal synthesis of $BaTiO_3$, Ti source is also added to the liquid phase in order to form $BaTiO_3$, since extensive hydrothermal synthesis studies have clearly suggest that the formation of $BaTiO_3$ could be achieved at temperatures from room temperature to 300° C. by utilizing simple compounds of Ba and Ti.

FIG. 5a displays the phase structure evolution of as-cold-sintered $BaTiO_3$ ceramics and after post annealing at 700-900° C. Further details within a specific angular range are also magnified as FIGS. 5b and 5c for better illustration. In the as-cold-sintered $BaTiO_3$ pellet, impurity phase is identified, as circled by the dash line (FIG. 5b). It has been commonly reported that $BaCO_3$ generally appears as a by-product during hydrothermal synthesis of $BaTiO_3$ since a certain amount of barium species react with $CO_2$ at certain temperatures. To this point, it is reasonable to deduce that the impurity phase (~24°) coincident with the (111) peak of the XRD spectrum of $BaCO_3$ is most likely owing to the formation of $BaCO_3$ through the chemical reaction between $Ba(OH)_2$ and the $CO_2$ resource in the atmosphere. To improve the phase purity, a post annealing process, as generally reported in the literature, is carried out at 700-900° C. As expected, the annealing process effectively removes the impurity phase through facilitating the formation of $BaTiO_3$; all the spectra profiles after annealing perfectly match with the perovskite structure. For the crystal symmetry perspective, the cubic phase seems to maintain unchanged after annealing at the temperatures ≤800° C., but an apparent cubic-to-tetragonal phase transformation occurs after annealing at 900° C., as indicated by the peak splitting ~45°. This crystallographic evolution from cubic to tetragonal symmetry is found to be consistent with the literature.

FIG. 5d illustrates the thermogravimetric property of the cold-sintered ceramic during annealing process. Even though only a slightly total weight loss of ~1.8% is observed, sharp changes can still be detected at different temperature stages, and this can be more easily identified when a weight loss derivative with respective to the temperature is considered, as marked by peaks P1-P4. With the assistance of mass spectrum, these peaks perfectly correlate with the burning out of two chemical species, the $OH^-$ (or $H_2O$) and $CO_2$. Firstly, the water vapor comes off at ~100° C., which might be attributed to the water detachment from the surface areas of ceramic powders. Heating up to ~300° C., the detection of $OH^-$ suggests a decomposition of certain hydroxide. Subsequent heating process leads to a consecutive releasing of $CO_2$, which is primarily observed at two temperature windows centered ~520° C. and ~780° C. These results suggest that the chemical reactions almost complete at ~900° C., and the annealing process will be most likely to affect the density development of the ceramics. To investigate this, FIG. 5e displays the density evolution of cold-sintered $BaTiO_3$, as well as corresponding ceramic pellets after annealing at 900° C., as a function of cold sintering time. Both curves show a similar trend with two notable stages: the ceramics cold-sintered less than 30 min exhibit low density; a boost appears once the sintering time is elongated to 30 min, and the density curve keeps an almost plateau configuration after that. The density of $BaTiO_3$ ceramics prepared by cold sintering process can even reach ~5.6 g cm$^{-3}$ (~93% relative dense if the theoretical density of 6.02 g cm$^{-3}$ is adopted) at a surprisingly low temperature (<200° C.) but also in a short time period (about 30 min). These two density evolution curves unambiguously indicate that the cold sintering process is determinant to the final density, even though the density can be slightly improved ~2% by a post annealing at relatively low temperature (700-900° C.) compare to the conventional thermal sintering temperature ~1200-1400° C. for $BaTiO_3$.

Based on the experimental observations, the underlying mechanism and primary stages during cold sintering and relative annealing process in $BaTiO_3$ nanoceramics is believed to occur as follows: $BaTiO_3$ nanoparticles are first homogeneously wetted with the water suspension containing the constituents for hydrothermal synthesis of $BaTiO_3$. With the assistance of external pressure, the liquid phase redistributes itself and fills into the pores between the particles, aiding particle compaction and rearrangement. Raising up the temperature facilitates the hydrothermal reactions to generate a glass phase, and also speeds up the partial dissolving of $BaTiO_3$ surfaces into the solution, resulting in a round shape of the crystallite. Once the cold sintering is performed at the temperature above the boiling point of water, a non-equilibrium dynamic environment is created and preserved until the water content is completely consumed. As the water vapor comes off the ceramic ensemble, further compaction proceeds under applied external pressure. As time elapses, the $BaTiO_3$ nanoparticles are tightly glued by newly formed glass phase, and a dense (~93% relative dense compare to $BaTiO_3$) crystalline and glass phases to reach an equilibrium state; corresponding ionic species and/or atomic clusters (ligands) in the glass phase precipitate on $BaTiO_3$ crystallites with lower chemical potential, as they are thermodynamically more favorable. When the precipitation process proceeds, the shape of the crystallite accommodates: a rounded configuration is generally manifested when the glass phase is prevalent, while polyhedron with flat facets is normally developed when the volume of glass phase is significantly reduced. Simultaneously, mass transport during this process minimizes the excess free energy of the surface area and removes surface and porosity; the areas of crystallite-crystallite contacts increase, leading to a formation of rigid particulate skeletal network, and also resulting in a further improvement of the density to ~95% relative dense.

It has been known that the hydrothermal synthesis of $BaTiO_3$ is a complicated process, and the chemical reaction path is highly dependent on the hydrothermal conditions. Even though the mechanism for the hydrothermal synthesis of $BaTiO_3$ is still under controversy as contradictive experimental observations have been reported in the literature, two mechanisms have been primarily proposed: the first one is the "in-situ transformation (or diffusion reaction) mechanism", which assumes that the chemical reaction is initiated at the surface of $TiO_2$ particles and triggers an heterogeneous nucleation process; the dissolved barium diffuses into $TiO_2$, resulting in a continuous layer of $BaTiO_3$ until $TiO_2$ is completely consumed. The other one is the "dissolution-precipitation mechanism", which suggests that $TiO_2$ particles first dissolve into the aqueous solution to generate amorphous hydroxytitanium complexes $(Ti(OH)^{n-})$, and then react with dissolved barium to precipitate $BaTiO_3$ homogeneously from the solution/glass environment. In considering of our chemical mapping observations, Ti element is found to be uniformly distributed into the glass phase. From this point of view, it seems to suggest that the presented cold sintering process most likely takes place via the dissolution-precipitation path aided by the epitaxial growth on $BaTiO_3$ particles.

In summary, a dense $BaTiO_3$ ceramic was successfully obtained at extraordinarily low temperature in contrast to the traditional thermal sintering generally performed at high temperature. Our experiments show that a highly dense crystal/glass compact (~93% relative dense compare to $BaTiO_3$) is firstly obtained at a surprisingly low temperature of 180° C.; then, post heat treatment leads to a thorough crystallization, and further improving the density to ~95% relative dense.

The processes of cold sintering of the present disclosure are applicable to preparing composites of sintered inorganic compounds, e.g. ceramics, with polymers. Co-sintering ceramic and polymers, e.g., thermoplastic polymers to form composites in a single step with very high volume fractions of ceramics seems unlikely, given the vast differences in the typical sintering temperatures of ceramics versus polymers. However, these processing limitations can be overcome with the sintering processes of the present disclosure.

In another aspect of the present disclosure, composites including one or more sintered inorganic compounds with one or more polymers can be formed. The process includes combining at least one inorganic compound in particle form with at least one polymer and a solvent that can partially solubilize the inorganic compound to form a mixture.

The process continues by applying pressure and heat to the mixture to evaporate the solvent and densify the at least one inorganic compound to form a sintered material or composite. The applied heat in the embodiment is the same as in earlier embodiments, e.g., the applied heat is at a temperature of no more than 200° C. above the boiling point of the solvent or at a temperature below about 250° C., e.g., below about 200° C. or below about 150° C., such as below about 100° C. The at least one inorganic compound can include a certain percentage of particles sized less than 100 µm, or less than 50 µm, 30 µm, 20 µm, 10 µm, and even less than about 5 µm or less than about 1 µm. A high relative density of the inorganic compound can be achieved in a short time period, e.g., a relative density of at least 85% and even greater than 90% can be achieved in less than 180 minutes, e.g., less than 120 minutes, such as no more than 60 minutes or 30 minutes.

Table 2 below provides an exemplary list of thermoplastic polymers suitable for cold sintering according to embodiments of the present disclosure.

TABLE 2

| Thermoplastic Polymers | Common Abbreviations |
| --- | --- |
| Acrylonitrile butadiene styrene | ABS |
| Aliphatic polyamides | |
| Poly(3,4-ethylenedioxythiophene) polystyrene sulfonate | PEDOT:PSS |
| Poly(methyl methacrylate) | PMMA |
| Poly(p-phenylene oxide) | PPE |
| Polybenzimidazole | PBI |
| Polycarbonate | PC |
| Polyetherether ketone | PEEK |
| Polyetherimide | PEI |
| Polyethersulfone | PES |
| Polyethylene | PE |
| Polypropylene | PP |
| Polystyrene | PS |
| Polytetrafluoroethylene | PTFE |
| Polyurethanes | |
| Polyvinyl chloride | PVC |
| Polyvinylidene difluoride | PVDF |
| Sulfonated tetrafluoroethylene (Nafion) | |

The sintering conditions of the present disclosure make it possible to co-sinter polymers and ceramic materials in a one-step sintering process. Three illustrative examples include: microwave dielectric $Li_2MoO_4$—$(—C_2F_4—)_n$ (PTFE), electrolyte $Li_{1.5}Al_{0.5}Ge_{1.5}(PO_4)_3$—$(—CH_2CF_2—)_x[—CF_2CF(CF_3)—]_y$ (PVDF-HFP), and semiconductor $V_2O_5$-PEDOT:PSS (poly(3,4-ethylenedioxythiophene) polystyrene sulfonate) composites to show a range of electrical functionalities created by the ability to co-process dense ceramics with polymers as the minor filler phase into previously unrealized composites. We select these composites to demonstrate new designs for dielectric property, electrical conductivity, and both electronic and ionic conductivity. Given the guidance and data in the present disclosure, polymer manufacturing approaches can be modified for the sintering of both ceramics and ceramic-polymer composites, resulting in saving very large amounts of energy in production, increasing throughput, and also allowing novel composite designs.

Figure 6A:
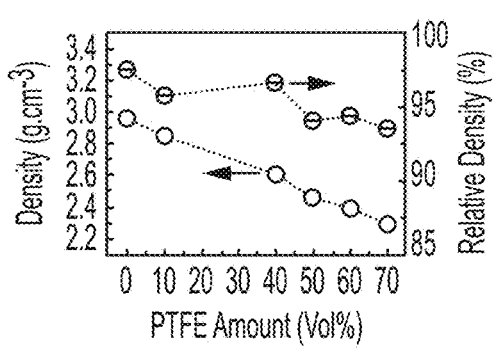
FIGS. 6a-6c are plots showing densities of: a) insulator-polymer (LM-PTFE), b) ionic conductor-polymer (LAGP-(PVDF-HFP)), and c) electronic conductor-polymer ($V_2O_5$-PEDOT:PSS) composites cold co-sintered at 120° C.
Figure 6B:
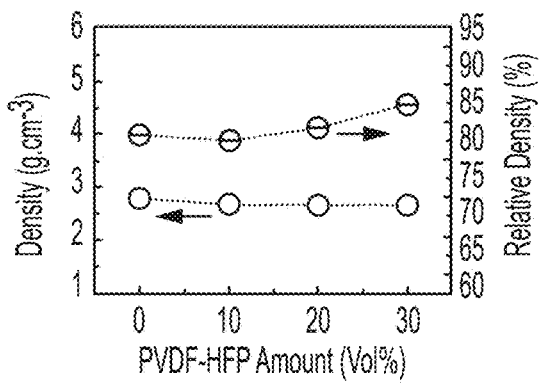
Figure 6C:
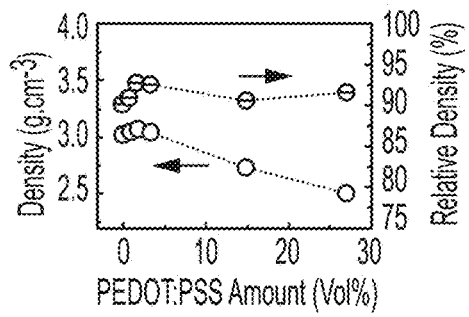

Dense $Li_2MoO_4$ (LM), $Li_{1.5}Al_{0.5}Ge_{1.5}(PO_4)_3$ (LAGP) and $V_2O_5$ ceramics can be cold sintered at 120° C. for 15-60 minutes, as shown in FIG. 6a-c, in contrast to high conventional thermal sintering temperatures and long holding times at 540° C. for 2 hours, 825° C. for 8 hours, and 450-660° C. for 2 to 26 hours, respectively. The polymer is a light weight material, and thereby the densities of the ceramic-polymer composites decrease with increasing amount of polymer (FIG. 6a-c). The polymers were specifically selected to compliment the properties of the ceramic materials. For example, PTFE is a very good dielectric material, PVDF-HFP is an excellent host for Li-salts in polymer gel electrolytes, and PEDOT:PSS is a good electronic conducting polymer. The relative densities of all the (1-x) LM-x PTFE and (1-x) $V_2O_5$-x PEDOT:PSS samples are higher than 90%, and the densities of (1-x) LAGP-x (PVDF-HFP) samples range between 80 to 88%, indicating that the ceramic-polymer composites can be sintered well by a cold sintered process. In contrast to the fluoropolymers PTFE and PVDF-HFP, the PEDOT:PSS is a hydrophilic polymer with a pH value around 1.5-2.5 in aqueous solution (3-4% PEDOT:PSS). The lower pH value of PEDOT:PSS can enhance the dissolution rate of $V_2O_5$ in water and slightly improve the relative density of (1-x) $V_2O_5$-x PEDOT:PSS composites.

There are no obvious impurity phases after the cold sintering, revealing that the ceramics and polymers can be co-sintered, and two-phase composites were formed. Using cold sintering according to the present disclosure allows preparation of dense samples with small and large amounts of polymer. When a small amount of polymer is used in the composition, the ceramic acts as the matrix material and the polymer the filler and when a large amount of polymer is used in the composition, the polymer acts as the matrix material and the ceramic the filler. Back scattered images and energy dispersive spectroscopy (EDS) maps of ceramic-polymer composites indicate that the densities of (1-x) LM-x PTFE, (1-x) LAGP-x (PVDF-HFP) and (1-x) $V_2O_5$-x PEDOT:PSS samples are relatively high, which is consistent with the density results above. It is also observed that good dispersion composites can be obtained after cold sintering at 120° C.

Figure 7A:
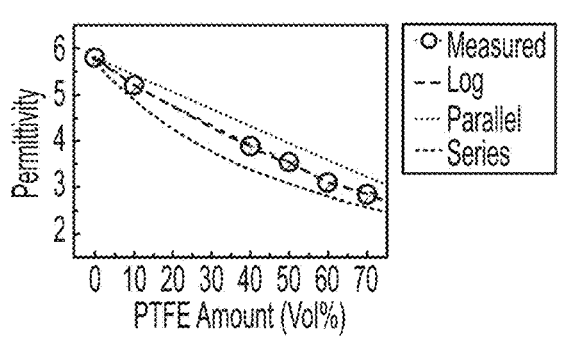
FIGS. 7a-7e illustrate electrical and mechanical properties of LM-PTFE composites as a function of PTFE volume fraction.
Figure 7B:
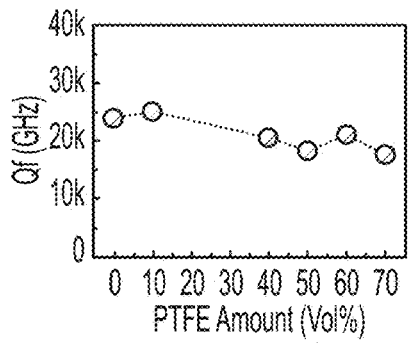

The performance of ceramic-polymer composites depends on the properties of the component materials, their volume fractions, phase connectivity, particle sizes, porosity, etc. Dense ceramic-polymer composites can be obtained by cold sintering according to the present disclosure. Therefore, by changing the amount of polymer, it is possible to design the properties of ceramic-polymer composites, such as electrical and mechanical properties, as illustrated in FIG. 7a. The microwave dielectric (electrical) properties of (1-x) LM-x PTFE composites as a function of x value are plotted in FIG. 7b-d. The permittivity of PTFE is lower than that of $Li_2MoO_4$, so that the relative permittivity of composites decrease from 5.8 to 2.9, with x increasing from 0 to 0.7. A number of models have been proposed to predict the average permittivity of two-phase or multi-phase composites. The simplest model is assuming that the composite materials are aligned parallel and perpendicular (series) to the electric field, which derives the upper bound (Equation 1) and lower bound (Equation 2) of the relative permittivity of the composite, ε, respectively:

$$\varepsilon = V_1\varepsilon_1 + V_2\varepsilon_2 \tag{1}$$

$$1/\varepsilon = V_1/\varepsilon_1 + V_2/\varepsilon_2 \tag{2}$$

Where $\varepsilon_1$ and $\varepsilon_2$ are relative permittivities of phase 1 and phase 2, respectively; $V_1$ and $V_2$ ($V_1+V_2=1$) are the volume fractions of these two phases. As shown in FIG. 7b, the measured relative permittivity of (1-x) LM-x PTFE composites are lower than the calculated ones obtained from parallel mixing law and higher than that calculated from series mixing law. Generally, the assumption of either perfectly parallel or perpendicular alignment is not appropriate for the real samples, and many modified models are deduced. Considered as a probability problem, the relative premittivity of the composite can be derived from the principles of statistics:

$$\varepsilon^n = V_1\varepsilon_1^n + V_2\varepsilon_2^n (-1 \leq n \leq 1) \tag{3}$$

When n=1 and n=-1, Equation 3 becomes parallel and series mixing laws, respectively. For a random distribution system, n approaches 0 and Equation 3 gives the expression of logarithmic mixing law:

$$\varepsilon = \varepsilon_1^{V_1}\varepsilon_2^{V_2} \text{ i.e. } lg\varepsilon = V_1 lg\varepsilon_1 + V_2 lg\varepsilon_2 \tag{4}$$

FIG. 7a shows that the measured permittivity data are in good agreement with the trends predicted by Equation 4.

Figure 7C:
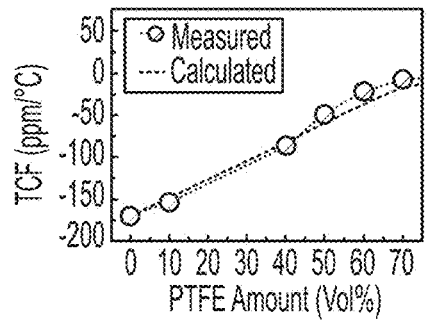
Figure 7D:
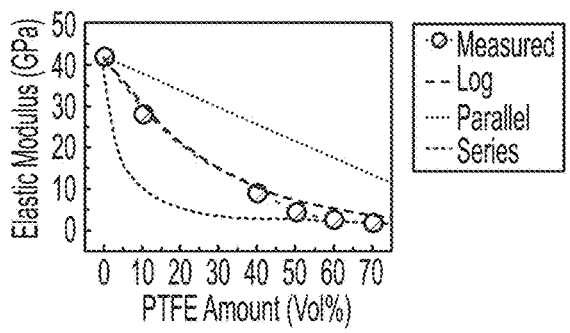

Quality factor (Q), the reciprocal of loss tangent (Q=1/tan δ) is an important parameter to denote the energy loss of the microwave system. FIG. 7c shows that the Q×f (f, resonant frequency) value has no obvious deterioration when the amount of PTFE changes, indicating that the (1-x) LM-x PTFE composite can be used for microwave application. We also demonstrate that the density, permittivity and Q×f value of (1-x) LM-x PTFE composites with a high volume fraction of ceramic can be improved by cold sintering, in contrast to conventional hot press process, as shown in Table 4 (provided in the Examples section below). Temperature coefficient of resonant frequency (TCF) represents the thermal stability of materials and can be obtained from the slope of the temperature-resonate frequency curve, TCF=1/$f_0$·df/dT. LM and PTFE have different TCF values, therefore, with x increasing from 0 to 0.7, the TCF value of (1-x) LM-x PTFE composites shift from −170 to −7.2 ppm ° C.$^{-1}$ (FIG. 7d). This result reveals that the thermal stability of resonate frequency of LM can be improved by adding PTFE. A simple assumption to predict the TCF values of composites is the linear mixing rule, which is derived from the logarithmic mixing law of permittivity:

$$TCF = V_1 TCF_1 + V_2 TCF_2 \tag{5}$$

Where $TCF_1$ and $TCF_2$ are TCF values of phase 1 and phase 2, respectively. It is seen that the experimental TCF values are similar to the predictions of Equation 5.

Figure 7E:
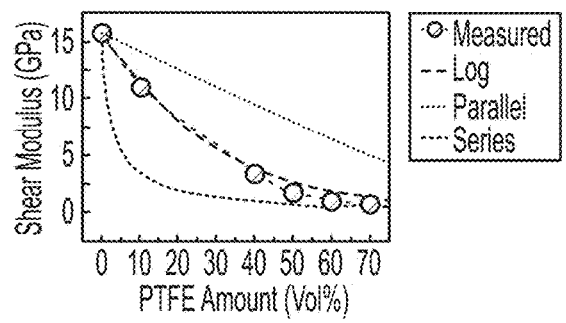

Polymers are relatively soft materials compared to ceramics which are stiff materials, so that the elastic and shear moduli of the (1-x) LM-x PTFE composites decrease with increasing PTFE content, as shown in FIG. 7e. Similar to the prediction of permittivity, there are numerous models to calculate elastic/shear modulus of composites. The upper and lower bounds can be determined assuming that the composite materials are aligned parallel and perpendicular (series) to the direction of loading, respectively. Generally, the modulus lies between the upper and lower bounds, as demonstrated in FIG. 7e. Here again using the logarithmic mixing rule, the measured modulus of composites has good agreement with the calculated one. When the amount of PTFE is large, the measured modulus is a little smaller than that of calculated one. In this region, PTFE can be considered as the matrix and the ceramic is the filler. Many other models can be used to predict the modulus of (1-x) LM-x PTFE composites.

Figure 8A:
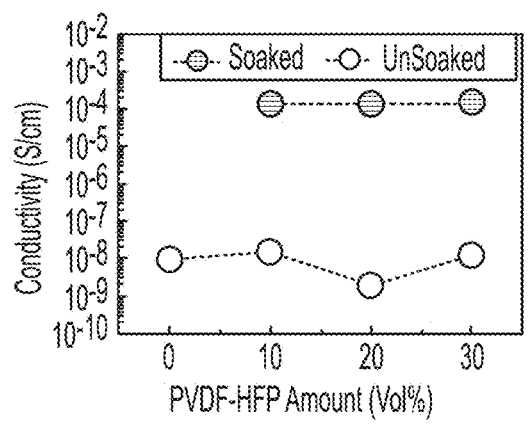
FIGS. 8a-8d illustrate electrical properties of ionic conductor-polymer (LAGP-(PVDF-HFP)) and electronic conductor-polymer ($V_2O_5$-PEDOT:PSS) composites.
Figure 8B:
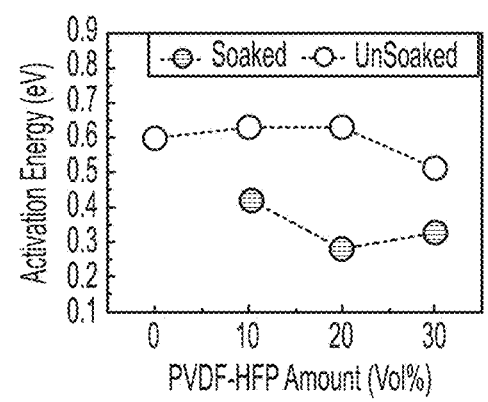

Amorphous regions of the PVDF-HFP copolymer absorb liquid electrolyte when soaked. Therefore, composite electrolytes were soaked in liquid electrolyte to boost ionic conductivity. Conductivities at 25° C. of (1-x) LAGP-x (PVDF-HFP) composites soaked in 1 M $LiPF_6$ EC-DMC (50:50 vol. %) ranged from $3.3 \times 10^{-5}$ to $1.4 \times 10'$S cm$^{-1}$, while activation energies ranged from 0.28 to 0.43 eV (FIGS. 8a and 8b). Well-crystallized, conventionally sintered LAGP has a conductivity of $3 \times 10'$S cm$^{-1}$ at 25° C. At temperatures <0° C., the liquid electrolyte freezes out, while >50° C., the liquid electrolyte dries out. Therefore, outside of the modest temperature range of 0° C. to 50° C., conductivity is not stable with holding time.

The total activation energy of cold sintered LAGP with and without polymer is consistent with a partially amorphous grain boundary (0.60 eV). Grain boundaries dominate the total conduction and total activation energy of cold sintered LAGP with and without polymer. In contrast, well-crystallized, conventionally sintered LAGP grain and grain boundary regions have similar activation energies (0.40±0.02 eV). Literature describes the origin of grain boundary resistance to be geometrical current constriction from limited grain boundary contact area. While co-sintering ceramic with polymer may physically bridge resistive grain boundaries, soaking the composite in liquid electrolyte is required to ionically bridge these resistive grain boundaries. Polymer swelling through liquid electrolyte uptake also increases grain boundary contact area. Compositions with polymer loadings ≥30 vol. %, where polymer swelling changes the composite dimensions, has been reported in flexible, solvent cast composites. After sixty days of soaking in liquid electrolyte at room temperature, dimensions of composite electrolytes of x≤0.30 in (1-x) LAGP-x (PVDF-HFP) did not change. No change in composite electrolyte dimensions is related to the cold sintered ceramic constraining the polymer's swelling.

Figure 8C:
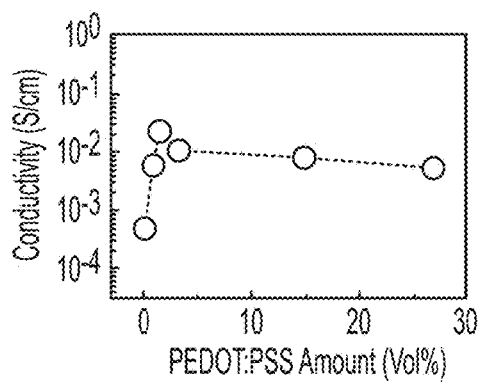
Figure 8D:
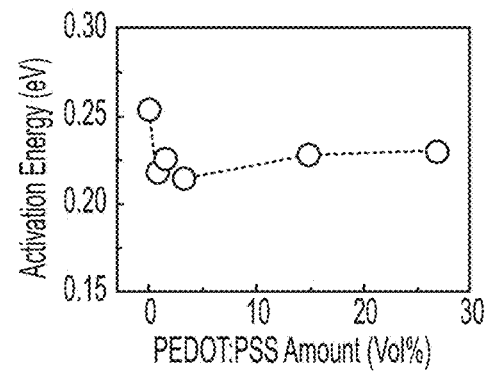

$V_2O_5$ is a wide bandgap semiconductor, which has an electronic DC conductivity (σ) of $10^{-5} \sim 10^{-3}$ S cm$^{-1}$ at room temperature and activation energy of 0.17-0.21 eV.[12] The DC conductivity ($4.8 \times 10'$S cm$^{-1}$) and activation energy (0.25 eV) of cold sintered $V_2O_5$ ceramics are comparable to that obtained by the conventional thermal sintering. Through the addition of PEDOT:PSS with a high conductivity of 150 S cm$^{-1}$ (18 μm film) at room temperature, further enhanced conductivity can be considered. This is demonstrated in cold sintered composites with the DC conductivity improving systematically with PEDOT:PSS additions, as shown in FIG. 8c. Surprisingly, the DC conductivity of (1-x) $V_2O_5$-x PEDOT:PSS composites can be increased by 1-2 orders only by adding up to 1-2% PEDOT:PSS. The activation energy of (1-x) $V_2O_5$-x PEDOT:PSS (0.8≤x≤0.27) composites is in the range of 0.22-0.23 eV, and lower than that of pure $V_2O_5$ ceramic (FIG. 8d).

In summary, ceramic-polymer composites can be prepared using cold sintering processes of the present disclosure. The composites can include a wide range of polymers and can be sintered to high densities by a low sintering temperature (e.g., as low as 120° C.) and for short time periods (e.g., ranging from 15-60 minutes). The electrical and mechanical properties of composites can be predicted by the mixing law. The cold sintering processes of the present disclosure can bridge the processing gap of ceramics and polymers, and open up a simple and effective way for material systems and devices using ceramics and polymers that are traditionally incompatible. Typically, hundreds of degrees separate the ability to co-process these materials in one step with high volume fractions of ceramic materials. Hence, the cold sintering processes of the present disclosure allows fabrication of sintered materials and composites that include a substance that degrades or oxides at a temperature above about 200° C.

Cold sintering allows for the fabrication of new materials and devices due primarily to its low temperature process. For example, the cold sintering process of the present disclosure allows densification of different materials such as ceramics, polymers and metals on the same substrate to obtain functional circuitry. Such materials and devices can be fabricated by depositing a ceramic, such as a ceramic paste, with or without other substances, on to a substrate (e.g., a substrate comprised of a metal, ceramic, polymer). The substrate can have an electrode layer between the deposited ceramic and substrate among other device layers. After deposition, the ceramic can be combined with a solvent such as by exposing the deposited ceramic to an aqueous solvent to form a more or less uniformily wetted deposited ceramic. Heat and pressure can then be applied to the deposited and wetted ceramic to sinter the ceramic on the substrate in the same manner as heat and pressure were described for other embodiments. In an embodiment, the process can be heated to less than 200° C., e.g., less than 150° C., with a pressure of no more than 5,000 MPa, e.g., less than 2,000 Mpa, or between about 30 Mpa to about 1,000 MPa. By the cold sintered process, the sintered ceramic on the substrate can achieve a relative density of greater than 80% such as no less than 85% and even greater than 90%. In addition, the high relative density of the ceramic can be achieved in a short time period, e.g., a relative density of at least 85% and even greater than 90% can be achieved in less than 180 minutes, e.g., less than 120 minutes, such as no more than 60 minutes and even no more than 30 minutes. Fabrication of cold sintered capacitors on both metal and polymeric substrates are provided in the examples below.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Powder Preparation. NaCl (99.9%), $Li_2CO_3$ (99%), $Na_2CO_3$ (99.95%), $K_2CO_3$ (99%), $MoO_3$ (99.5%), $WO_3$ (99.8%), $V_2O_3$ (99.7%), CsBr (99%), $CsSO_4$ (99%), $ZnMoO_4$ (98%), $Gd_2O_3$ (99.99%), $Na_2WO_4 \cdot 2H_2O$ (95%), $LiVO_3$ (99.9%), $BiVO_4$ (99.9%), $AgVO_3$, $Na_2ZrO_3$ (98%), $KH_2PO_4$ (99%), and citric acid monohydrate (99.5%) were purchased from Alfa Aesar. $BaFe_{12}O_{19}$ (97%) nanopowders, $V_2O_5$ (98%), and ZnO (99%) were provided by Sigma-Aldrich. $Bi_2O_3$ (99.9%), E-glass fibers (70 μm) and Teflon (PTFE) were purchased from MCP Inc., TAP Plastics Inc. and Howard Piano Industries, respectively. $Li_2MoO_4$, $Na_2Mo_2O_7$, $K_2Mo_2O_7$ and $Li_2WO_4$ powders were synthesized by the solid state reaction method using stoichiometric amounts of $Li_2CO_3$, $Na_2CO_3$, $K_2CO_3$, $MoO_3$ and $WO_3$. Mixtures of raw materials were milled with zirconia balls in ethanol for 24 h. After being dried, the powders were calcined in air at 450-600° C., followed by a second ball mill with $ZrO_2$ and ethanol for 24 h. Then, some $Li_2MoO_4$ powders were mixed with $BaFe_{12}O_{19}$, PTFE, and E-glass fibers (abbreviated as "EG") according to the following formula: $0.8Li_2MoO_4$-$0.2BaFe_{12}O_{19}$, $0.5Li_2MoO_4$-0.5PTFE, and $0.8Li_2MoO_4$-0.2EG (Volume Fraction). The mixtures were ball milled in ethanol and then dried. The particle sizes for these materials were accessed with SEM Scanning electron microscopy and the particle sizes were in the range of 0.5 to 10 microns.

Bulk Ceramic Preparation. Dense ceramics of $MoO_3$, $WO_3$, $V_2O_3$, $V_2O_5$, ZnO, $Bi_2O_3$, CsBr, $Li_2CO_3$, $CsSO_4$, $Li_2MoO_4$, $Na_2Mo_2O_7$, $K_2Mo_2O_7$, $ZnMoO_4$, $Gd_2(MoO_4)_3$, $Li_2WO_4$, $Na_2WO_4$, $LiVO_3$, $BiVO_4$, $AgVO_3$, $Na_2ZrO_3$, $LiFePO_4$, and $KH_2PO_4$, and dense composites of $Li_2MoO_4$—$BaFe_{12}O_{19}$, $Li_2MoO_4$-PTFE, and $Li_2MoO_4$-EG were prepared via the following methods including a cold-sintering step.

Method 1: All the powders except ZnO were mixed with 4-25 wt % deionized water using a pipet. ZnO was mixed with an aqueous acetic acid solvent with concentration of 0.5-5.0 M acetic acid (pH value of about 2-4). After being stirred with a mortar and pestle, the moistened powders were hot-pressed with a steel die into dense pellets (12.7 mm in diameter and 1-5 mm in height) under a uniaxial pressure of 80~570 MPa at 120° C. The die was preheated at 120° C. for more than 1 h. Finally, the pellets were placed into an oven at 120° C. for 6 h to remove the possibility of water residue.

Method 2: All the dry powders were pressed into soft pellets under a low pressure (30~70 MPa) at room temperature. Then, the pellets were put in a humid atmosphere (water vapor generated by heating deionized water or humidity chamber) for 10-360 min. The moistened pellets were hot-pressed with a steel die into dense pellets under a uniaxial pressure of 80~570 MPa at 120° C. The die was preheated at 120° C. for more than 1 h. Finally, the pellets were placed into an oven at 120° C. for 6 h to remove the possibility of water residue.

Multilayer Ceramic Preparation.

$Li_2MoO_4$ and $K_2Mo_2O_7$ tapes were prepared by the tape casting procedure. The powders were first added into a solution of 96 wt % methylethylketone (MEK) and 4 wt % Qpac, and milled with zirconia balls. Then, another solution of 66.3 wt % methylethylketone (MEK), 28.4 wt % Qpac and 5.3 wt % Santicizer-160 was added into the slurry, followed by an additional ball milling. Tape casting was performed using a laboratory-type casting machine with a doctor blade casting head. Silicone-coated mylar (polyethylene terephthalate) was used as a carrier film. The cast slurry was dried at room temperature. For $Li_2MoO_4$—$K_2Mo_2O_7$ multilayer, $Li_2MoO_4$ and $K_2Mo_2O_7$ green tapes were stacked alternately. For $Li_2MoO_4$—Ag multilayer, silver paste was printed on the $Li_2MoO_4$ green tape and two silver-printed layers and ten $Li_2MoO_4$ layers were stacked together. Then, the stacked $Li_2MoO_4$—$K_2Mo_2O_7$ and $Li_2MoO_4$—Ag layers were laminated under an isostatic pressure of 20 MPa at 80° C. for 20 min. The binders were burn out at 175° C. for 10 h in air with a heating rate of 0.5° C./min. The multilayers were sintered using a cold-sintering fabrication step, as described previously. In particular, the multilayers were put in a humid atmosphere (water vapor generated by heating deionized water or humidity chamber) for 10-360 min. Then, the moistened multilayers were hot-pressed with a steel die into dense ceramics under a uniaxial pressure of 80~570 MPa at 120° C. The die was preheated at 120° C. for more than 1 h. After cold sintering, the co-fired multilayers were placed into an oven at 120° C. for 6 h to remove the possibility of residual hydroxides.

The bulk densities of the sintered samples were measured by Mass/Geometry ratio and Archimedes' method. Relative densities were determined by the ratio of experiment measured bulk density over the density of corresponding density of the materials in the form of single crystals.

Table 3 below provides densities and performance characteristics for certain ceramics prepared with a cold sintering step including water as a solvent and at 120° C. under a pressure of 350 MPa.

TABLE 3

| | Cold Sintering Process (CSP) | | | Conventional Thermal Sintering Process Performance |
|---|---|---|---|---|
| | Density ($g/cm^3$) | Relative Density | Performance | |
| $Li_2MoO_4$ | 2.9 | 95.7% | $\varepsilon_r = 5.6$<br>$Q \times f = 30,600$ GHz<br>$\tan\delta = 5.7 \times 10^{-4}$<br>(17.4 GHz) | $\varepsilon_r = 5.5$<br>$Q \times f = 46,000$ GHz |
| $Na_2Mo_2O_7$ | 3.45 | 93.7% | $\varepsilon_r = 13.4$<br>$Q \times f = 14,900$ GHz<br>$\tan\delta = 7.5 \times 10^{-4}$<br>(11.2 GHz) | $\varepsilon_r = 12.9$<br>$Q \times f = 62,400$ GHz |
| $K_2Mo_2O_7$ | 3.39 | 94.1% | $\varepsilon_r = 9.8$<br>$Q \times f = 16,000$ GHz<br>$\tan\delta = 8.3 \times 10^{-4}$<br>(13.3 GHz) | $\varepsilon_r = 7.5$<br>$Q \times f = 22,000$ GHz |
| $V_2O_5$ | 3.03 | 90.2% | $\sigma_c = 4.8 \times 10^{-4}$ S/cm | $\sigma_c = 10^{-5}$~$10^{-3}$ S/cm |

$\varepsilon_r$, microwave permittivity. $\tan\delta$, loss. Q, quality factor (Q = 1/$\tan\delta$). f, resonate frequency. $\sigma_c$, DC conductivity.

Hydrothermal Assisted Ceramic Processing.

$BaTiO_3$ nanopowders (99.9%, 50 nm with cubic phase) were purchased from commercial resource (e.g., US Research Nanomaterials, Inc.). $Ba(OH)_2/TiO_2$ suspension was made by mixing corresponding chemicals with deionized water. The molar ratio of $Ba(OH)_2:TiO_2$ was 1.2:1, and the concentration of $Ba(OH)_2$ was 0.1 mol $L^{-1}$. To form a ceramic pellet, 0.14-0.15 g $Ba(OH)_2/TiO_2$ suspension was added to 0.56 g $BaTiO_3$ nanopowders; the mixtures were grinded using pestle and mortar for 3 minutes. The mixture was uniaxially pressed under 430 MPa first at room temperature (25° C.) for 10 minutes, and then the temperature was ramped up to 180° C. with an overall rate of 9° C. $\min^{-1}$. The temperature was isothermally kept for 1 minute to 3 hours to obtain a series of samples. The as-prepared ceramic pellets were first baked at 200° C. overnight to further remove possible water residue, and then further annealed at 700-900° C. for 3 hours with a temperature ramp rate of 5° C. $\min^{-1}$ in air. The densities were measured by Archimedes method using acetone (0.791 g $cm^{-3}$) as a liquid media.

The phase structures were checked by X-ray diffraction (Panalytical, X'Pert PRO) with Cu-Kα radiation. For dielectric measurements, platinum was sputtered as electrodes, and the dielectric properties were measured at 1 kHz-1 MHz by LCR meter (HP4284A, Agilent Technologies) during cooling from 200° C. to room temperature with 2° C. min-1 rate. Thermogravimetric-Mass Spectrum (TGA-MS Q50, TA Instrument) analysis was performed in helium atmosphere from 30 to 900° C. with 10° C. min-1. Ceramic powders crushed from the sintered pellets were used. Before heating up, the samples were kept at 30° C. for 1 hour to reach an equilibrium state. TEM specimens were prepared via standard procedures including mechanical thinning, polishing, and ion milling. The specimens were polished down to ~30 μm thick, and then mounted on molybdenum grids. The foils were further thinned with an Ar-ion mill (Gatan, PIPS II) until an electron transparent perforation was formed. A cryogenic stage was used to cool the specimen to the liquid $N_2$ temperature during ion milling to minimize structural damage and artifacts. Microstructural and chemical studies were performed on a Talos (FEI, Talos) microscopy equipped with an Energy Dispersive X-ray Spectroscopy (EDS) system operating at an accelerating voltage of 200 kV.

Ceramic/Polymer Composites.

(1-x) LM-x PTFE Powder Preparation:

To obtain fine powders, $Li_2MoO_4$ (Alfa Aesar, 99%) was ground with a mortar and then ball milled in ethanol for 48 h. After being dried, the $Li_2MoO_4$ powder was mixed with PTFE (Howard Piano Industries) according to the following composition: (1-x) LM-x PTFE (x=0, 10, 40, 50, 60, 70 vol. %). The mixture was ball milled in ethanol for 24 h, followed by drying at 85° C.

$Li_{1.5}Al_{0.5}Ge_{1.5}(PO_4)_3$ Powder Preparation:

Stoichiometric amounts of $Li_2CO_3$ (Alfa Aesar, 99%), $Al_2O_3$(Tape Casting Warehouse, Inc.), $GeO_2$ (Alfa Aesar, 99.98%), and $NH_4H_2PO_4$ (Alfa Aesar, 98%) were ball milled for 24 h, calcined in air at 750° C. for 30 min, and again ball milled for 24 h. Milled powder was placed in a covered alumina crucible and melted in air at 1380° C. for 1 h before being splat-quenched. Splat-quenched glass was annealed at 450° C. for 3.75 h and crystallized in air at 825° C. for 8 h. Glass-ceramic powder was sieved through a 74 μm mesh.

(1-x)$V_2O_5$-x PEDOT:PSS powder Preparation:

$V_2O_5$ powders (Sigma Aldrich, 98%) were first dispersed in deionized water and then mixed with PEDOT:PSS solution (Sigma Aldrich, High-Conductivity Grade, 3-4% in $H_2O$) in proportion (x=0, 0.8, 1.6, 3.2, 14.9, 27 vol. %). The mixture was stirred at room temperature for 4 h, and dried at 120° C.

Composite Cold Sintering:

Dense composites were prepared by a cold sintering process. In the case of (1-x) LM-x PTFE, appropriate amounts of deionized water (6 to 12 wt. %) were added to the mixture of $Li_2MoO_4$ and PTFE, and mixed homogeneously with a mortar and pestle. Afterwards, the moistened powders were pressed into dense samples under 350 MPa uniaxial pressure at 120° C. for 15-20 min. In the case of (1-x) LAGP-x (PVDF-HFP), 30 to 39 vol. % of deionized water was added to LAGP and homogenized in a mortar and pestle. LAGP and PVDF-HFP (Arkema, Kynar Powerflex LBG) were mixed by swirling in liquid nitrogen and pressed under 400 MPa uniaxial pressure at 120° C. for 1 h. For (1-x) $V_2O_5$-x PEDOT:PSS, moistening took place with deionized water (11 to 17 wt. %) and dense ceramic-polymer composites were pressed under a uniaxial pressure of 350 MPa at 120° C. for 20-30 min.

Characterization:

The phase purity and composition of composites after cold sintering were determined by X-ray diffraction (PANalytical Empyrean). An environmental scanning electron microscope (ESEM, FEI, Quanta 200) with an energy dispersive spectrometer (EDS) was used to analyze microstructures and elemental distribution of Cold Sintered samples on cross section. Bulk densities were measured by mass/geometric volume ratio and Archimedes method. The microwave dielectric properties (permittivity and Q×f valve) of (1-x) LM-x PTFE were identified using the Hakki-Coleman method in $TE_{011}$ mode with a vector network analyzer (Anritsu 37369D). The temperature coefficient of resonant frequency (TCF) value was obtained using $TE_{01\delta}$ shielded cavity method with a network analyzer, cylindrical resonant cavity and temperature chamber (Delta 9023, Delta Design, Poway, Calif.), and calculated as follows: TCF=$(f_{85}-f_{25})/(f_{25}(85-25))\cdot 10^6$ ppm ° $C.^{-1}$, where $f_{25}$ and $f_{85}$ were the resonant frequencies at 25° C. and 85° C., respectively. The elastic and shear modulus measurements were performed by sound velocity method based on ASTM standard E 494-05. To perform impedance measurements on Li-ion conducting (1-x) LAGP-x (PVDF-HFP) composites, Au electrodes, 100 nm thick, were sputtered on the pellet faces. Pellets were soaked in 1 M $LiPF_6$ EC-DMC (50:50 vol. %) (BASF Selectilyte LP 30) at 25° C. inside an Ar glovebox and wiped of excess liquid before being loaded into air-tight cells for impedance spectroscopy (Solartron Ametek ModuLab). Uptake of liquid was 5 to 10 wt. % (10 to 12 μL). In order to measure the DC electrical conductivity on (1-x) $V_2O_5$-x PEDOT:PSS, the disks were cut into bars with a dimension of 10×2×1 mm. After polishing the bars, Pt electrodes were deposited and Ag wires were attached with Ag epoxy (Epo-tek H20E). The DC electrical conductivity was measured using a four terminal technique with a Keithley 2700 Integra series digital multimeter.

Table 4 below provides densities and dielectric properties of $0.9Li_2MoO_4$-$0.1PTFE$ composite prepared by Hot Press and Cold Sintering Process (CSP)

TABLE 4

| | Density (g cm$^{-3}$) | Relative Density (%) | $\epsilon_r$ | Q × f (GHz) | tanδ |
|---|---|---|---|---|---|
| Hot Press | 2.5 | 85 | 4.7 | 10430 | $1.7 \times 10^{-3}$ (22.9 GHz) |
| CSP | 2.85 | 95.8 | 5.2 | 25150 | $7.2 \times 10^{-4}$ (18.1 GHz) |

Electroceramics

A ceramic ink was prepared using Lithium Molybdenum Oxide powder (99+%, Alfa Aesar, Ward Hill, Mass.) that was ball-milled in ethanol for 48-100 hours before use. A printing vehicle was made by mixing QPAC 40 (poly (propylene carbonate)) resin (Empower Materials, New Castle, Del.) with Ethylene Glycol Diacetate (97%, Alfa Aesar, Ward Hill, Mass.) in amounts of 15 and 85 wt % respectively in a planetary centrifugal mixer (AR250, Thinky USA, Laguna Hills, Calif.) until the resin was completely dissolved in the solvent. To formulate the ink, LizMoat, the printing vehicle, additional ethylene glycol diacetate and Butyl Benzyl Phthalate S-160 (Tape Casting Warehouse, Morrisville, Pa.) in amounts of 66.1, 22.0, 11.0, and 0.9 wt % respectively were blended and homogenized in the planetary centrifugal mixer.

Substrates were prepared by cutting PET (Polyethylene terephthalate) sheets (Tape Casting Warehouse, Morrisville, N.J.) into 32 by 32 mm squares, and then metallized using silver ink (5029, DuPont, Wilmington, Del., USA) in a 25.4 by 25.4 mm square pattern to form a bottom electrode. A 200 mesh stainless steel screen (UTZ LLC, Little Falls, N.J.) was used to print the pattern. The silver ink was cured at 120° C. for 30 minutes. Alternatively, 50 micron thick Nickel foil (99+%, Alfa Aesar, Ward Hill, Mass.) substrates were also prepared. A ceramic ink was printed onto the metallized PET substrates using a 400 calendared mesh stainless steel screen with a pattern of 5 by 5 mm squares. A double pass was used for each printed layer of the double-layered prints, where the ink was dried at 120° C. for 15 minutes between layers. Ceramic ink was also printed onto the Nickel Foil substrates using a 25.4 by 25.4 mm square pattern, 200 mesh screen as described above. Single layered prints were dried as above. Binder burnout was performed at 0.2° C./min to 150° C. for the Nickel samples, and 175° C. for the PET samples, with a dwell at peak temperature for 6 hours.

Cold Sintering was performed by first exposing the printed samples to water vapor in a sealed beaker at 35-40° C. until the bright white prints just turned a dull gray color, which indicated that water had absorbed into the printed ink squares. Wetted samples were allowed to sit for approximately a minute to allow excess water to equilibrate before placing a silicone coated PET sheet on top of the printed film. The sample was then placed between several sheets of paper or Polytetrafluoroethylene (PTFE) sheets and loaded into the platen press preheated to 120° C. The paper and PTFE were used to help evenly distribute pressure on the samples with a 70 to 100 MPa pressure being applied to the stacks for 12-15 minutes. At the end of the lamination cycle, the paper or PTFE and PET film was carefully removed from the sample, and the printed film displayed a translucent light gray color. Top electrodes were applied in a circular configuration using colloidal silver paste (PELCO, Ted Pella, Redding, Calif.). The electrodes were allowed to dry at room temperature for 10 minutes.

Capacitance, C and loss (tan δ) at room temperature, 1 kHz were measured using an LCR meter (Model E4980, Agilent, Santa Clara, Calif.) for the PET samples and for the Nickel foil samples, an LCR meter (Model SR715, Stanford Research, Sunnyvale, Calif.) was used. Thickness, t, was measured by using a dial gauge (Model ND280, Heidenhain, Traunreut, Germany). The relative permittivity, $\varepsilon_r$, was calculated from a parallel plate capacitor approximation, using the area, A, of the top electrode, and the formula, $C=\varepsilon_o\varepsilon_r A/t$. The microstructure of the printed samples was studied by using an environmental scanning emission microscope (E-SEM, FEI Quanta 200, Hillsboro, Oreg.).

Figure 9A:
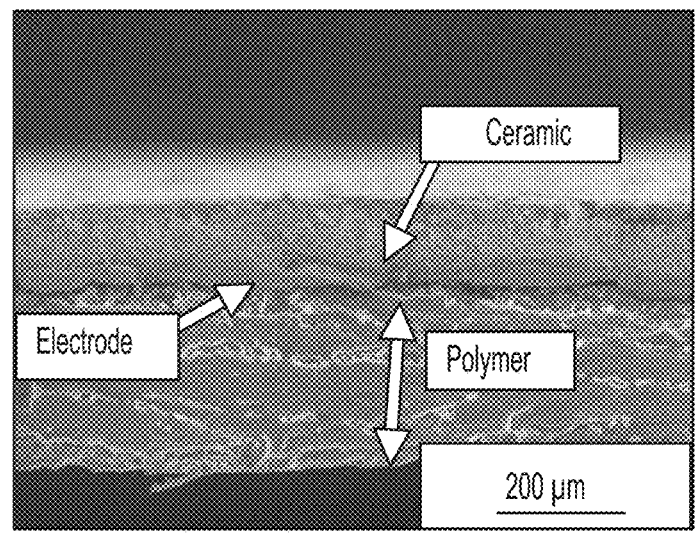
FIGS. 9a-b are scanning electron micrographs of a cross-sectional view of a cold sintered $Li_2MoO_4$ in a single layered capacitor structure.
Figure 9B:
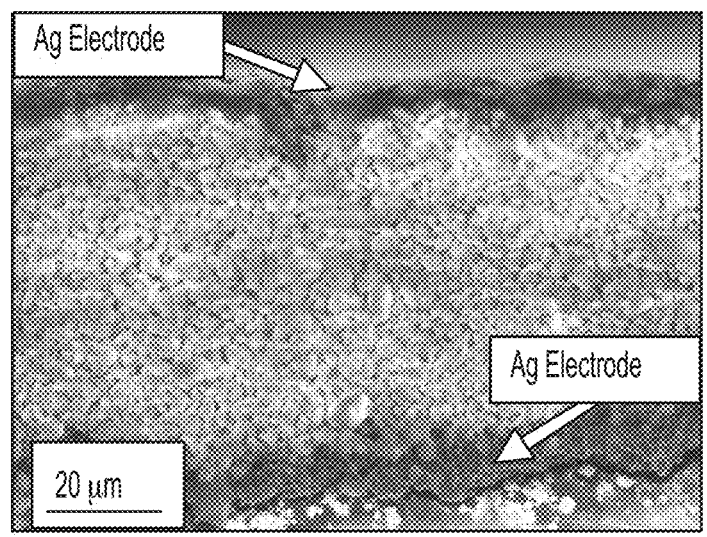

Capacitance and loss at room temperature, 1 kHz were measured and permittivity was calculated based on a determined print thickness of 20-21 microns for the single-layered capacitors on Nickel foil, and 30-31 microns for the double-layered printed capacitors on PET film. It appears that lamination conditions, such as the type of paper or plastic surrounding the sample during pressing can influence electrical properties. It was observed that several sheets of glossy paper gave the smoothest, and most even lamination condition, as all 9 capacitors in the array appeared to be densified. This was indicated by a color change from white, which represented green state samples to a dull gray which indicated densified samples, and similar electrical characteristics. Results of the averaged dielectric properties are summarized in Table 5 along with various modifications to the process. The reported dielectric properties for $Li_2MoO_4$ fired at 540° C. and measured at room temperature at 13.051 GHz is a relative permittivity of 5.5. See Zhou et al., "Microwave Dielectric Ceramics in $Li_2O$—$Bi_2O_3$—$MoO_3$ System with Ultra-Low Sintering Temperatures," J. Am. Ceram. Soc., 93 [4] 1096-100 (2010). FIGS. 9a-9b shows the cross-sectional view of printed and sintered $Li_2MoO_4$ ceramic ink with Ag electrodes on PET film. The $Li_2MoO_4$ ceramic coexists with Ag electrodes, indicating that the printed $Li_2MoO_4$ ceramic can be co-sintered with Ag electrodes by a cold sintering process at 120° C.

TABLE 5

Summary of Electrical Properties of Cold sintered $Li_2MoO_4$ printed capacitors tested at room temperature, 1 kHz

| Substrate Type | Pressing Conditions | Capacitance | Tan δ | Dielectric Constant | Pressing Aid |
|---|---|---|---|---|---|
| Ni Foil | 100 MPa, 15 min. @ 120° C. | 52 pF | 0.012 | 4.4 | paper |
| Ni Foil | 100 MPa, 15 min. @ 120° C. | 47 pF | 0.025 | 3.6 | PFTE |
| PET | 100 MPa, 12 min. @ 120° C. | 17.1 pF | 0.006 | 5.0 | Glossy paper |

By this example, we demonstrated fabrication of printed $Li_2MoO_4$ capacitor structures on both Nickel foil and PET film by a cold sintering process. With conventional processing methods, where the sintering of the $Li_2MoO_4$ would take place at 540° C., this would be impossible because the Nickel foil would oxidize in air at temperatures above 300° C., and the PET film would thermally degrade at temperatures of about 225° C. to 260° C. Further, this example shows cold sintering processes of the present disclosure can accommodate flexible substrates, and forming structures of many different inorganics sintered thereon. The relative density of the sintered ceramic on the substrate in these examples is estimated to be no less than about 90% based on the performance of the prepared capacitors relative to conventionally prepared capacitors.

Cold sintered printed $Li_2MoO_4$ capacitors have electrical and microstructural properties that are similar to those that have been conventionally processed. The ability to co-process incompatible materials systems, such as low temperature polymers with high temperature ceramics, allows production of variety of new composites for device construction. Moreover, energy and time savings by employing the cold sintering method are significant when compared to conventional sintering methods.

Figure 10:
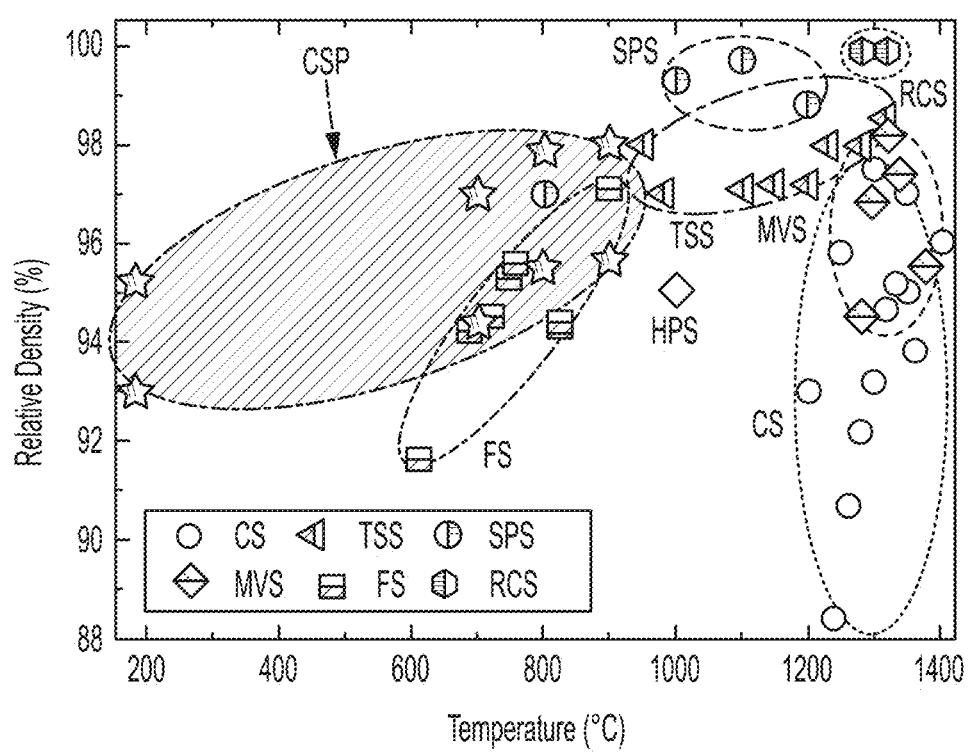
FIG. 10 is a plot comparing relative density to sintering temperature of inorganic materials (example $BaTiO_3$) made by different processes. The different processes include: Conventional Sintering (CS), Two-Step Sintering (TSS), Rate-Controlled Sintering (RCS), Spark Plasma Sintering (SPS), Microwave Sintering (MVS), High Pressure Sintering (HPS), Flash Sintering (FS), Combined=RRS (Rapid-Rate Sintering)-RCS-LP (Low Pressure)-TSS, and Cold Sintering Processes (CSP) in accordance with the present disclosure. A theoretical density of 6.02 g/cm3 is adopted for $BaTiO_3$. GS=Grain Size.

FIG. 10 is a plot comparing relative density to sintering temperature of inorganic materials (example $BaTiO_3$) made by different processes. The different processes include: Conventional Sintering (CS), Two-Step Sintering (TSS), Rate-Controlled Sintering (RCS), Spark Plasma Sintering (SPS), Microwave Sintering (MVS), High Pressure Sintering (HPS), Flash Sintering (FS), Combined=RRS (Rapid-Rate Sintering)-RCS-LP (Low Pressure)-TSS, and Cold Sintering Processes (CSP) in accordance with the present disclosure. A theoretical density of 6.02 g/cm3 is adopted for $BaTiO_3$. GS=Grain Size. As shown in the plot, cold sintering processes of the present disclosure are capable of fabricating relatively dense inorganic materials such as ceramics at far lower temperatures than conventional fabrication methods.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process for preparing a sintered material on a substrate, the process comprising depositing a ceramic on a substrate followed by exposing the deposited ceramic to an aqueous solvent to form a wetted deposited ceramic and applying pressure and heat to the wetted deposited ceramic to sinter the ceramic on the substrate, wherein the applied heat is no more than 200° C. the applied pressure is no more than 5,000 MPa and the ceramic is sintered to a relative density of no less than 85%; and
   wherein the applying of the pressure and the heat to the wetted deposited ceramic to sinter the ceramic on the substrate is applied via an unsealed device exposed to atmospheric pressure to evaporate the solvent such that evaporated solvent leaves the wetted deposited ceramic and exits the unsealed device during the applying of the pressure and heat.

2. The process of claim 1, wherein the solvent includes one or more of a C1-12 alcohol, ketone, ester, or water, or an organic acid or mixtures thereof and wherein the solvent has a boiling point below 200° C.

3. The process of claim 1, wherein the solvent includes at least 50% by weight of water.

4. The process of claim 1, wherein the ceramic and the solvent are combined by exposing the ceramic to a controlled relative atmosphere of the solvent.

5. The process of claim 1, wherein the applied heat is at a temperature of less than 150° C.

6. The process of claim 1, wherein the relative density of the sintered material is greater than 90%.

7. The process of claim 1, wherein the ceramic has a particle size of less than 30 μm.

8. The process of claim 1, further comprising milling the ceramic prior to forming the wetted deposited ceramic.

9. The sintered material of claim 1.

10. The process of claim 1, wherein the sintered material achieves a relative density of at least 90% in a time period of no more than 30 minutes.

11. The process of claim 1, wherein the sintered material is incorporated into a microwave device, electronic package, a thermoelectric energy-conversion system, an electrochemical system, a battery, a lithium ion battery, a ceramic filter or a catalytic support.

12. The process of claim 1, wherein the sintered material is incorporated into an electronic device.

13. The process of claim 1, wherein the sintered material is incorporated into a capacitor.

14. The process of claim 1, wherein the sintered material is incorporated into an electroceramic.

15. The process of claim 1, wherein the sintered material achieves a relative density of at least 85% in a time period of less than 180 minutes or no more than 120 minutes.

16. The process of claim 15, wherein the ceramic and the solvent are combined by exposing the ceramic to a controlled relative atmosphere of the solvent.

17. The process of claim 15, wherein the sintered material achieves a relative density of at least 85% in a time period of no more than 120 minutes.

18. The process of claim 1, wherein the applied heat is at a temperature of no more than 200° C. above the boiling point of the solvent at the atmospheric pressure.

19. The process of claim 1, wherein the applying of the pressure and the heat to the wetted deposited ceramic to sinter the ceramic on the substrate is applied via the unsealed device in an open system so that the sintered material achieves a relative density of at least 85% in a time period of less than 180 minutes.

20. The process of claim 1, wherein the applying of the pressure and the heat to the wetted deposited ceramic to sinter the ceramic on the substrate evaporates the solvent.

21. The process of claim 1, wherein the substrate is comprised of a metal, a ceramic, a polymer, or combinations thereof.

22. A process for preparing a sintered material on a substrate, the process comprising depositing an inorganic compound on a substrate followed by exposing the deposited inorganic compound to an aqueous solvent to form a wetted deposited inorganic compound and applying pressure and heat to the wetted deposited inorganic compound to evaporate the solvent and sinter the inorganic compound on the substrate, wherein the applied heat is no more than 200° C., the applied pressure is no more than 5,000 MPa and the inorganic compound is sintered to a relative density of no less than 85%; and
   wherein the applying of the pressure and the heat to the wetted deposited inorganic compound to sinter the inorganic compound on the substrate is applied via an unsealed device exposed to atmospheric pressure to evaporate the solvent such that evaporated solvent leaves the wetted deposited inorganic compound and exits the unsealed device during the applying of the pressure and heat.

23. The process of claim 22, wherein the inorganic compound is a polymeric material or a composite material and the substrate is comprised of a metal, a ceramic, a polymer, or combinations thereof.

24. The process of claim 1, wherein the sintered material achieves a relative density of at least 85% in a time period of no more than 60 minutes.

* * * * *